(12) United States Patent
Wilson

(10) Patent No.: US 9,377,313 B2
(45) Date of Patent: Jun. 28, 2016

(54) METHODS AND SYSTEMS FOR CREATING DIGITAL STREET NETWORK DATABASE

(75) Inventor: Christopher Kenneth Hoover Wilson, Emerald Hills, CA (US)

(73) Assignee: TomTom North America Inc., Lebanon, NH (US)

( * ) Notice: Subject to any disclaimer, the term of this patent is extended or adjusted under 35 U.S.C. 154(b) by 445 days.

(21) Appl. No.: 13/378,717

(22) PCT Filed: May 21, 2010

(86) PCT No.: PCT/US2010/035694
§ 371 (c)(1),
(2), (4) Date: Dec. 16, 2011

(87) PCT Pub. No.: WO2010/147730
PCT Pub. Date: Dec. 23, 2010

(65) Prior Publication Data
US 2012/0095682 A1    Apr. 19, 2012

Related U.S. Application Data

(60) Provisional application No. 61/187,494, filed on Jun. 16, 2009, provisional application No. 61/273,185, filed on Aug. 3, 2009, provisional application No. 61/279,981, filed on Oct. 29, 2009.

(51) Int. Cl.
*G01C 21/32* (2006.01)

(52) U.S. Cl.
CPC ........................ *G01C 21/32* (2013.01)

(58) Field of Classification Search
CPC .... B60W 30/045; B60W 30/12; G01C 15/00; G01C 21/26; G01C 21/28; G01C 21/32; G01C 21/3492; G01C 21/36; G01C 21/00; G01C 21/30; G06F 17/30241; G06F 17/30265; G06F 17/30289; G06F 17/30817; G06F 17/3087; G08G 1/01; G08G 1/0104; G08G 1/09; G08G 1/096844; G08G 1/09686
USPC ........... 703/2; 340/988, 995.14, 995.2; 702/5, 702/150; 701/117, 400, 408, 409, 411, 450, 701/461, 468, 469, 495, 517, 532; 707/E17.018
See application file for complete search history.

(56) References Cited

U.S. PATENT DOCUMENTS

| | | | |
|---|---|---|---|
| 6,385,539 B1 | 5/2002 | Wilson et al. | |
| 7,197,500 B1 | 3/2007 | Israni et al. | |
| 7,516,041 B2 | 4/2009 | Smartt et al. | |
| 2005/0004753 A1* | 1/2005 | Weiland et al. | 701/208 |
| 2006/0155464 A1* | 7/2006 | Smartt | 701/208 |
| 2007/0129892 A1 | 6/2007 | Smartt et al. | |
| 2009/0005958 A1* | 1/2009 | Roesser | 701/117 |

OTHER PUBLICATIONS

International Search Report issued Jul. 14, 2010 for International Application No. PCT/US2010/035694.
Stefan Schroedl et al: "Mining GPS Traces 1-15 for Map Refinement", Data Mining and Knowledge Discovery, Kluwer Academic Publishers, BO, vol. 9, No. I, Jul. 1, 2004, pp. 59-87, XP019277108, ISSN: 1573-756X * figures 2-4, 14 ** pp. 59-67 *.

* cited by examiner

*Primary Examiner* — Tuan C. To
*Assistant Examiner* — Genna Mott

(57) ABSTRACT

In a method for creating a digital representation of a transportation network location measurement data is acquired, and a plurality of maneuvers between choke points are generated from the location measurement data. The digital representation of the transportation network is then created and stored based on the plurality of maneuvers.

14 Claims, 12 Drawing Sheets

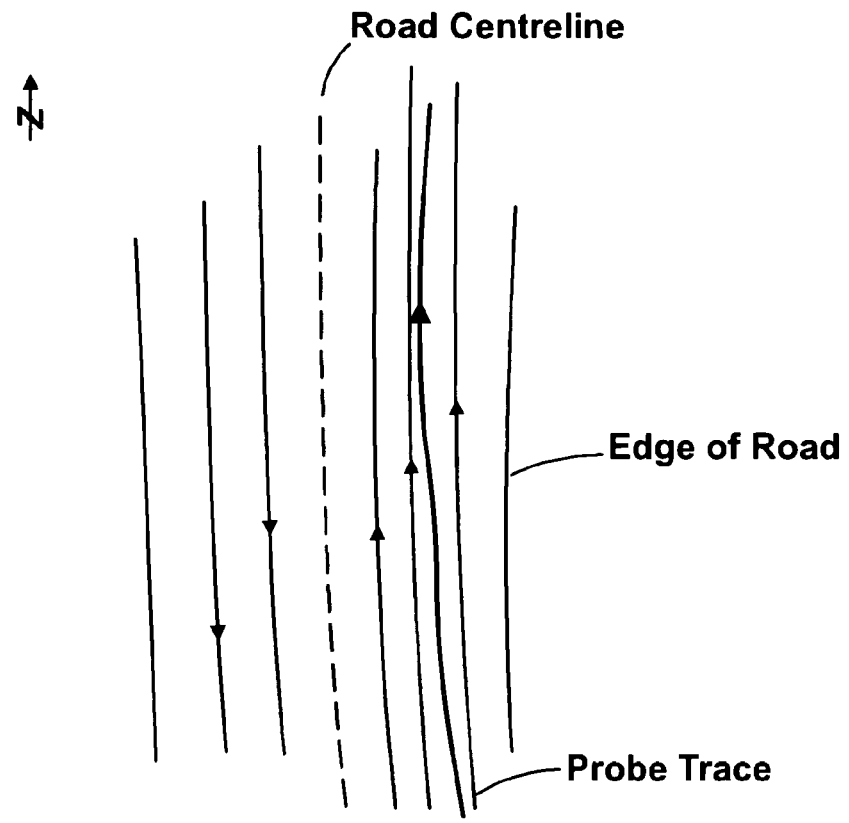
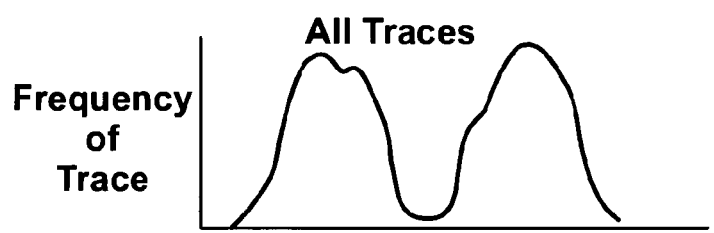
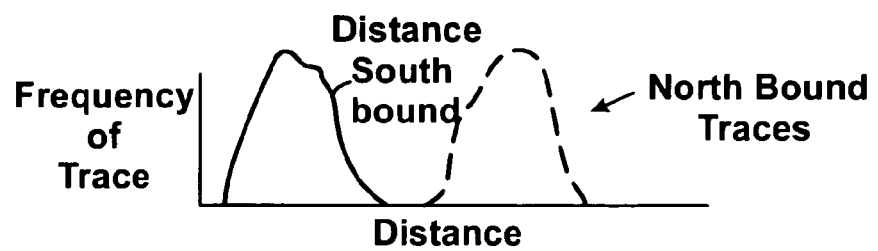
Fig. 9

METHODS AND SYSTEMS FOR CREATING DIGITAL STREET NETWORK DATABASE

CROSS-REFERENCE TO RELATED APPLICATION(S)

This application is the National Stage of International Application No. PCT/US2010/035694, filed May 21, 2010 and designating the United States, which claims priority under 35 U.S.C. §119(e) to U.S. provisional application Nos. 61/187,494, filed on Jun. 16, 2009; 61/273,185, filed on Aug. 3, 2009; and 61/279,981, filed on Oct. 26, 2009. The entire content of each of these applications is incorporated herein by reference.

FIELD

The present application generally relates to navigation methods and devices. More specifically, at least some example embodiments relate to methods and systems for creating and storing digital representations of transportation networks.

BACKGROUND

A transportation network is any navigable system of roads, pedestrian walkways, paths, rivers, shipping lanes or other network that is utilized to transport humans or vehicles. A transportation network can also include combinations of routes for the above modes of transportation. These combinations of routes are referred to as multimodal transportation networks. A segment of a transportation network (referred to as a transportation network segment) is a portion of the transportation network that represents a path of travel for a vehicle or pedestrian without a method of entry or exit other than at its end points.

One method of creating or updating a digital transportation network is by traversing paths/elements of the transportation network with highly specialized location measuring and recording systems designed for this purpose. In alternative methods, transportation network information is gleaned from aerial images or compiled from existing localized digital transportation networks. In addition, combinations of the above methods can be utilized.

More recently, probe traces acquired from location sensors carried in a series of uncoordinated vehicles or by numerous pedestrians has been used for creating/updating and/or refining a transportation network. Probe traces are a plurality of sequential location measurements from location sensors. Location sensors are usually part of a navigation system or housed in a multi-purpose device such as a smartphone.

Utilization of uncoordinated probe traces has generally been limited to updating an existing transportation network because the approximate location of transportation segments must be known in order to determine if a given probe trace traverses a particular segment. Thus, probe traces are typically used only to refine and improve accuracy. Conventionally, digital transportation networks are not generated or built (e.g., created from scratch) based on uncoordinated probe traces. In addition, the conventional art does not address the junction of transportation network segments in an automated fashion.

Moreover, location measurements from a single location sensor are typically not sufficiently accurate to generate a digital transportation network for certain applications such as an Advance Driver Assistance System (ADAS). For example, positional accuracy for a road network in an ADAS should be less than about 5 meters. But, typical location measurements from conventional location sensors are on the order of about +/−10 to 15 meters.

SUMMARY

Example embodiments relate to methods for creating digital representations of transportation networks. At least some other example embodiments relate to methods for storing digital transportation networks.

Transportation network databases according to example embodiments may be used in routing and navigation applications requiring relatively high accuracy and/or precision such as Advanced Driver Assistance Systems (ADASs).

Methods described herein are also suitable for building and/or creating a digital transportation network based on a series of sequential location measurement data or series of probe traces acquired by on-board navigation devices (NDs), personal navigation devices (PNDs) or other location sensors capable of: collecting sequential location measurement data, storing the sequential location measurement data and transmitting the sequential location measurement data to a central storage or processing unit for processing. Combinations of sequential location measurement data (or probe traces) from sources of varying accuracy can also be combined with traces derived from aerial imagery.

Methods described herein are also suitable for building and/or creating a digital transportation network based on a series of sequential location measurement data or series of probe traces acquired by on-board navigation devices (NDs), personal navigation devices (PNDs) or other location sensors capable of: collecting sequential location measurement data, storing the sequential location measurement data and transmitting the sequential location measurement data from one navigation device to one or more other navigation devices via in-vehicle communications, without a central storage or processing unit. In this example, each navigation device may build and/or create at least a portion of its own digital transportation network on-the-fly based on information received from one or more other navigation devices.

At least some example embodiments provide methods for determining which intersecting road segments are connected in terms of traffic flow. The location and information regarding, or associated with, connections between road segments enables a transportation network suitable for vehicle routing.

Although example embodiments described herein refer to roadways and transportation networks utilized by automobiles, the methods described herein are also pertinent to other types of transportation networks such as pedestrian or bicycle networks, railroads, shipping lanes, etc. In addition, the combinations of the above modes of transportation may also be utilized in a multimodal navigation network. Likewise, as there are location sensors capable of functioning within buildings, the transportation networks may also be located indoors.

Although example embodiments will be described with regard to sequential location measurements or sequential location measurement data, example embodiments may be based on random location measurement data. Moreover, example embodiments may also be based on a combination of sequential location measurement data and random location measurement data.

At least some example embodiments described herein do not require a "seed" or basic representation of the transportation network being created to generate the transportation network geometry.

BRIEF DESCRIPTION OF THE DRAWINGS

Various aspects of the teachings of the present disclosure, and arrangements embodying those teachings, will hereafter be described by way of illustrative example with reference to the accompanying drawings, in which:

FIG. 9 shows example probe traces along a two-lane road;

DETAILED DESCRIPTION OF EXAMPLE EMBODIMENTS

Figure 1:
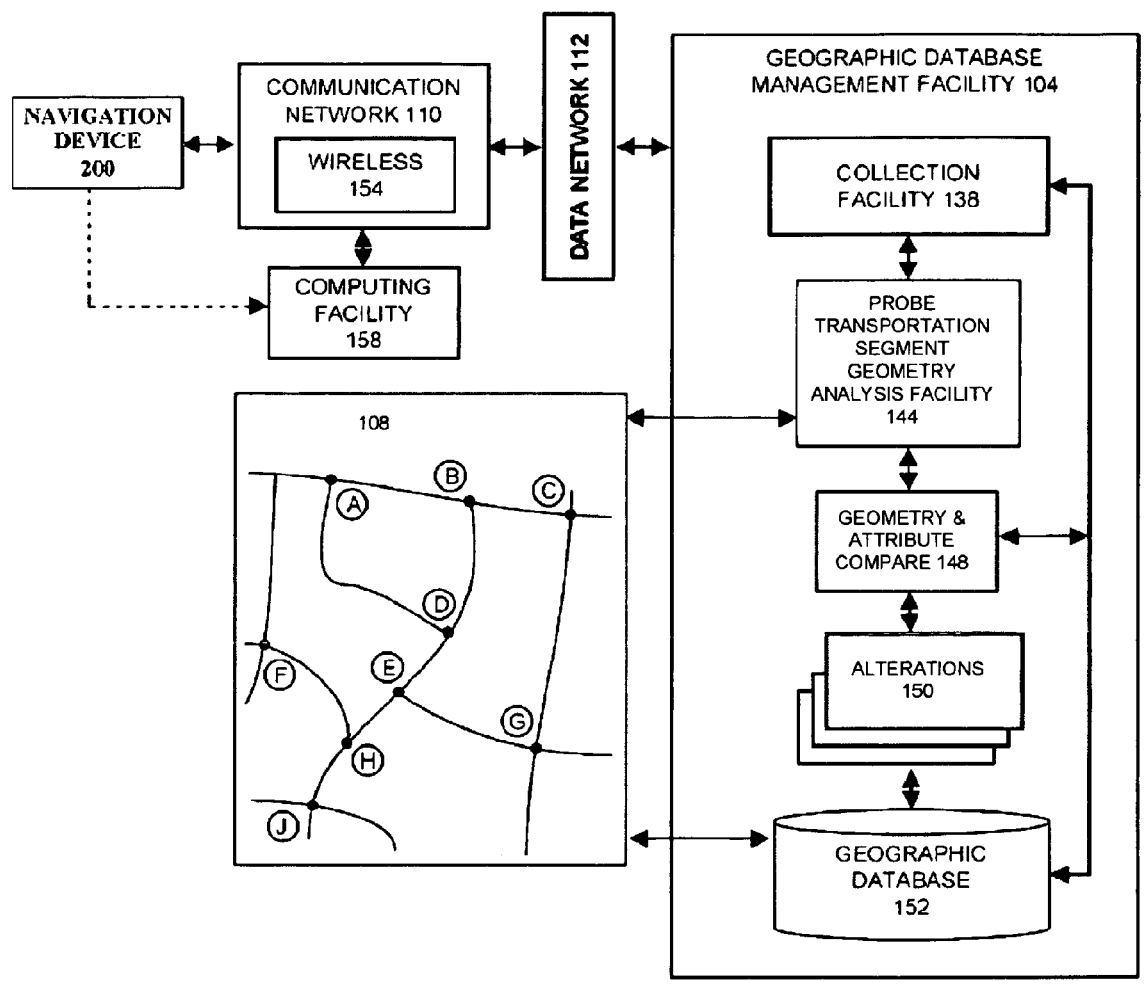
FIG. 1 is a block diagram detailing various component parts of a map database system according to an example embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, for example, those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation(s) on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing," "computing," "calculating," "determining," "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

In at least some cases, example embodiments of the present disclosure are described with particular reference to a geographic database. It should be remembered, however, that the teachings of the present disclosure are not limited to any particular form of database but are instead universally applicable to any type of database and/or any processing device that is configured to execute a program to access data in a data structure, the data being associated with mapping data, but not exclusively mapping data. It follows therefore that in the context of the present application, a geographic database is intended to include any database accessible to a server, computer or computing device configured for accessing data, generating new maps and/or updating maps based on the accessed data.

Example embodiments of the present disclosure may be described with particular reference to a navigation device (ND) or personal navigation device (PND). It should be remembered, however, that the teachings of the present disclosure are not limited to NDs or PNDs, but are instead universally applicable to any type of processing device that is configured to execute navigation software so as to provide route planning and navigation functionality. It follows, therefore, that in the context of the present application, a navigation device is intended to include (without limitation) any type of route planning and navigation device, irrespective of whether that device is embodied as a PND, a navigation device built into a vehicle, or a computing resource (such as a desktop or portable personal computer (PC), mobile telephone or portable digital assistant (PDA)) executing route planning and navigation software. In addition to street/road networks, example embodiments may be implemented in pedestrian navigation networks and/or any other type of transportation network (e.g., a metro train) or combinations of transportation networks (referred to as multimodal transportation networks).

Segments in these transportation networks (e.g., a portion of a road and/or sidewalk) are often referred to as navigable features. Boundaries of these segments (e.g., centerlines, shoulder lines, stop signs, etc.) may be referred to as geometric features. Navigable and geometric features are not limited in any way to the aforementioned examples.

While example embodiments described herein utilize GPS measurements (probe trace points) including latitude and longitude coordinates as location measurements, it should be understood that location measurements may be obtained from any source and are not limited to GPS. For example, other Global Navigation Satellite Systems (GNSSs) such as GLONAS, Galileo, Compas, etc. or non-GNSS systems (e.g., inertial indoor systems may be used.

Further, while location measurements described herein operate in two spatial dimensions, the discussed example embodiments may be implemented in three or more dimensions.

It will be apparent from the following description that the teachings of the present disclosure have utility in circumstances where a user is not seeking instructions on how to navigate from one point to another, but merely wishes to be provided with a view of a given location.

A transportation network can be modeled and stored as a digital representation in a digital map database. In so doing, the transportation network is usually represented by geometry and associated attribution. In the context of a transportation network, attribution limits how travel can flow on the network and can be referred to as travel restrictions. For example, attribution may include: speed of travel, whether or not a turn at an intersection is allowed, etc.

Geometry can be stored in the digital map database as a series of polylines connected at nodes. Polylines are a series of sequential coordinates that usually represent the centerline of a transportation segment. Nodes are points where two or more polylines connect, and generally occur at intersections where there is a decision point with respect to travel from one transportation network segment to another. Nodes can also occur at intersections with other map features such as a political boundary, geographic feature (e.g., a river), etc.

Alternatively, geometry can be stored as maneuvers in the digital map database by fitting a polyline to a path taken by a group of vehicles (a population) all traveling from one point to another. Examples of maneuvers through an intersection are: a left turn, traveling straight through, or a right turn. If legal, a u-turn is also a possible maneuver. In this case, nodes do not coincide with intersections. Rather, nodes are placed at non-decision points (or choke points) where all traffic must travel in the same direction and there is no option to turn off a given path. In this example, geometry describes a maneuver or maneuvers, which defines the path taken between two non-decision points, and the nodes represent locations where one can transition between maneuvers.

Yet another method to store transportation network geometry, rather than as polylines, is a series of mathematical curves. A curve would replace a polyline in either the conventional or maneuver based storage. Examples of curves are a polynomial and clothoid.

A vast majority of geographical information system (GIS) digital maps represent linear features (e.g., streets, water, political, land use, recreational boundaries, etc.) as chained polyline segments connected by mutual endpoints, which are often referred to as shape points. These points represent a point in 2D or 3D space deemed to be along the path of the line of travel, service, or boundary. These shape points are usually inflections or bends along a single path, such that when two line edges meet at any shape point they are generally not co-linear. The clear intention of such lines is to represent the real-world feature to a reasonably good approximation in a reasonably simple and compact form. Travel along the actual real-world path or boundary can be approximately represented by traversing each successive line segment.

The above-described polyline format is a simplified model of real-world paths; its primary strength is its simplicity. This format is relatively easy to draw on a raster screen, and readily allows computations for length, distance, and other geometric queries. However, representation by polylines is plagued with representation error because actual linear features are much more complex and composed of non-line segment components. Any attempt to reduce this representation error requires an increase in the density of the data; no finite amount of data stored in a line segment format can perfectly represent a non-line segment shape.

A clothoid is a two-dimensional shape or path defined to have constant change in curvature over the travel distance. In one example, a clothoid resembles a clock spring, with zero curvature at one end, and then coiling ever tighter at the other end. Arcs and line segments are simply special cases of the clothoid. A circular arc is a clothoid because the circular arc has a constant curvature—that is, zero curvature change—wherein the curvature magnitude is inversely related to that circle's radius. A straight line is also a clothoid, having both a no-curvature change and a constant curvature of zero over its entire length.

Clothoids and their special cases (e.g., circular arcs and straight lines) are used in much real-world construction. Roads, in particular, are often constructed from pieced segments including straight lines, circular arcs, and clothoids. Roadbed designers recognize that roadway curvature directly relates to movement of steering wheels and axle components of vehicles traversing the roadway. For them, limiting any abrupt changes in curvature by choosing clothoid design where feasible represents a decision that improves and/or maximizes vehicular safety and comfort, while reducing and/or minimizing wear on roadway components.

The concept of splines is available in mathematics. Though originally referring to a thin flexible rod used to draw curves, the term is mathematically understood as a function fit in which the fitting function has some number of continuous derivatives. Taking the above-discussed example, one can see that in order to reduce and/or minimize disruptive changes in steering, a vehicular path should be a spline with respect to heading change over distance traveled, with the first derivative of heading change per unit distance (e.g., curvature) being a continuous function. This type of function is referred to herein as the "clothoid spline."

In a database, the geometry of a multiple-lane two-way traffic roadway may be represented as a single polyline (or mathematical curve) that traverses the centerline of the roadway. However, for Advanced Driver Assistance System (ADAS) applications, it may be necessary to store an individual centerline for each lane and/or for each direction of traffic. This is especially true if the database is stored as maneuvers because it may not be possible to exit a right side off-ramp on an interstate highway from a left side lane. Therefore, a separate maneuver including the right bound lane turning into an off-ramp would need to be stored. An additional maneuver would follow a left bound lane until such time as it intersects another freeway. For a transportation network including multiple lane roadways, storage of geometry and attribution in the transportation network will vary depending on the level of sophistication of the application utilizing the data and the accuracy at which the geometry information can be measured.

Example embodiments discussed herein utilize a 'maneuver' as a fundamental unit to create a digital representation of a transportation network.

At least some example embodiments create and store the resulting digital network as connected polylines with segment endpoints at intersections.

At least some example embodiments create and store the resulting digital network as polyline representations of maneuvers with endpoints at choke points.

At least some example embodiments create and store the digital network as a series of mathematical curve representations of maneuvers connected at choke points.

According to at least one example embodiment, a 'maneuver' refers to the average path of numerous vehicles that travel along the same or substantially the same route or path between two points. Endpoints of the maneuver typically occur at points where travel can only happen along a single path (not at an intersection or other decision point). The use of a maneuver is intended to capture differences in the paths of vehicles based on what the vehicles will do (e.g., turn right or go straight) and what they have done (e.g., came from the left or from straight). For example, the use of the maneuver is intended to capture differences in the paths of vehicles based on predicted and observed behavior patterns.

In one example embodiment, a maneuver represents a path that would be chosen by a relatively significant group of drivers based on the driving situation. For example, movement of drivers into a new lane as the new lane forms is considered a maneuver because many people will move into a new lane when the new lane begins. However, a lane change at an unmotivated place in the network is not considered a maneuver because there is little or no pattern of lane changes at that particular point. Maneuvers typically describe paths that vehicles take through one or more intersections, although maneuvers may also describe a lane change, or even going straight in the same lane. But, this would likely be concatenated with a previous or subsequent maneuver. A maneuver may also be composed of a plurality of other maneuvers, either sequentially, or at different spatial resolutions.

There is no presumption that there needs to be a particular number of intersections traversed by a given maneuver, only that a relatively significant number of vehicles follow the same path through successive intersections, independent of the distance between the start and end points. In general, at the end of any maneuver the driver has a choice of at least two maneuvers to traverse, which is dependent on the destination. Each maneuver end point is associated with at least two maneuver start points (except at dead ends). Moreover, each maneuver start point should be associated with at least two maneuver end points.

Figure 5:
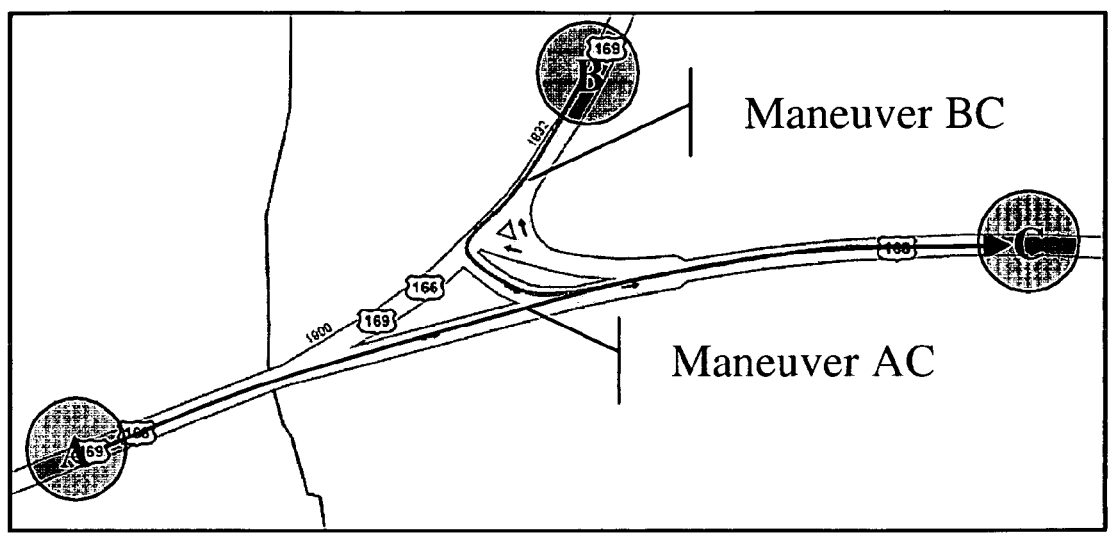
FIG. 5 shows two example maneuvers AC and BC that traverse an intersection.

Although the storage of maneuvers may require redundant storage of geometry where different maneuvers coincide, using maneuvers in applications such as vehicle routing is more computationally efficient because the number of transportation elements that need to be traversed is significantly reduced. In FIG. 5, for example, to describe a path from point A to C in a conventional database, which stores the road network as a series of segments that end at every intersection, 4 road segments are required to describe the path. Using maneuvers, however, only a single road segment is required to describe the path. FIG. 5 will be described in more detail later.

Choke points, as described herein, are usable to create both conventional street networks (in which nodes are at intersections) and maneuver based networks (in which nodes are at choke points) from probe traces. The choke points may be used to identify when traces are on the same road.

Maneuver based storage is unique and potentially advantageous. For example, if a route having a left turn is calculated, then using a conventional storage, one would be traversing two street segments with an associated speed for each segment that would generally be much higher than the speed one could travel when making a left turn. In a maneuver model, the speed would be associated with actually turning left and your estimated travel time would be much closer to the truth. Likewise, the maneuver based model would actually indicate that one needs to be in a left hand turn lane at the intersection.

A vehicle is always performing (or on) one and only one maneuver. Maneuvers can be connected only at their ends (also called nodes), transition nodes or choke points, usually in a one to many, many to one, or many to many situation. A maneuver may also terminate at one end with no connection to other maneuvers (a dead end). The statistical characteristics of the populations of the vehicles traveling on a given maneuver are indistinguishable, which is the determining factor for a maneuver. A vehicle normally will not transition between maneuvers in the middle of either maneuver. Rather, a vehicle normally will transition between maneuvers at node points connecting two maneuvers. But, the unmotivated lane change mentioned above is an exception to this rule.

In many cases, the statistics of two maneuver populations are indistinguishable from examining a single location. This is the case at a maneuver transition location (referred to sometimes herein as a "node," "transition node," or choke point). Accordingly, one has to examine a different location to observe the divergence of the population statistics. This implies that the identification of a maneuver depends on observed parameters and the resolution with which the parameters are observed. In this example, parameters may include: position, speed, and/or acceleration. However, example embodiments are not limited to these examples. Rather, parameters may include any other characteristic of the vehicle, at any and all resolutions.

As discussed herein, a "probe trace" or "trace" is a sequential and generally periodic set of location measurements (or location measurement data) taken during an individual vehicle or pedestrian trip and represents the path through the transportation network. A "trace" may also be digitized or processed from imagery that depicts the transportation path. A "bundle of traces" or "trace bundle" (also referred to as a cluster of traces or trace cluster) refers to a set of traces that travel the same path from one point to another. A "path" refers to a line 'on the ground' that drivers are attempting to follow. The mean of a trace bundle refers to the statistical centerline of the bundle.

A maneuver may be identified when a portion of several probe traces follow substantially the same path. Maneuvers are further characterized by generally passing through a decision point. A decision point is defined as a location on a path where several paths can be taken going forward. Examples of a decision point are: an intersection where you can go straight, turn right or left; a point or place at which an additional lane, which you can turn into, is added; etc. The beginning or starting point (or node) of a maneuver is somewhat arbitrarily defined as a location between two adjacent decision points along a path. An example maneuver starting point is the point along a probe trace that is half the distance between two decision points, or the point along probe trace clusters where the statistical variance in path location and heading is at a minimum.

Beginning and ending nodes of a maneuver are generally further defined as connection points between no other maneuvers (a dead end) or two or more other maneuvers. A more detailed example for identifying starting and ending points of maneuvers is discussed below.

Because start/end nodes of maneuvers occur between decision points, the geometry of at least two of the maneuvers that either start or end at the same node is, by definition, coincident until a decision point is reached. Referring to FIG. 5, for example, as both maneuver AC and BC end at node C, the geometry is coincident where the two maneuvers intersect until node C.

Some maneuvers may not be present in the database because they are not yet identified. And, occasionally there may be mid-maneuver transitions.

Although example embodiments will be described with regard to sequential location measurements or sequential location measurement data, example embodiments may be based on random location measurement data. Moreover, example embodiments may also be based on a combination of sequential location measurement data and random location measurement data. As discussed herein, "location measurement data" may refer to sequential location measurement data, random location measurement data or a combination of sequential and random location measurement data.

At least one example embodiment provides a method for creating a digital representation of a transportation network. The method includes: acquiring location measurement data for an area of interest; generating a plurality of maneuvers between choke points from the location measurement data; and creating and storing the digital representation of the transportation network based on the plurality of maneuvers.

At least one other example embodiment provides an Advance Driver Assistance System (ADAS) including a digital representation of the transportation network created according to a method including: acquiring location measurement data for an area of interest; generating a plurality of maneuvers between choke points from the location measurement data; and creating and storing the digital representation of the transportation network based on the plurality of maneuvers.

At least one other example embodiment provides a system for creating a digital representation of a transportation network. The system includes: a maneuver generation module configured to generate a plurality of maneuvers between choke points from location measurement data for an area of interest; and a digital transportation network generation module configured to create and store the digital representation of the transportation network based on the plurality of maneuvers.

According to at least some example embodiments, each of the choke points is a non-decision point that falls between adjacent decision points along a cluster of location measurement data. The decision points are points at which the cluster of location measurement data following the same path diverge to one of several paths or points at which the cluster of location measurement data converge to a single path.

According to at least some example embodiments, a maneuver geometry is determined based on a mean path of a collection of location measurement data that traverse a same path between adjacent choke points.

In at least one example embodiment, the digital representation of the transportation network is stored as polyline representation of the plurality of maneuvers. Alternatively, or in addition, the digital representation of the transportation network is stored as a mathematical curve representation of the plurality of maneuvers. The transportation network is a vehicle network in which a maneuver represents a single lane of street segments, the street segments including a plurality of lanes.

The location measurement data may be acquired from at least one of: (i) a plurality of location probes; and (ii) digitizing paths from aerial imagery. The choke points are associated with characteristics of the location measurement data. The characteristics include: relative accuracy of the location measurement data and at least one of direction of movement, speed, and type of location probe from which the location measurement data are taken.

According to at least one example embodiment, the method may further include: clustering the location measurement data for location probes following a same path; determining decision points in the transportation network by comparing the clusters of location measurement data; and creating choke points based on the clusters of location measurement data and the determined decision points. The plurality of maneuvers are generated by examining clustered segments of the transportation network between adjacent ones of the created choke points. The clustered segments of the transportation network are stored as the digital representation of the transportation network.

According to at least one other example embodiment, the method further includes: clustering the location measurement data for location probes following a same path; determining decision points in the transportation network by comparing the clusters of location measurement data; creating choke points based on the clusters of location measurement data and the determined decision points; and fitting a mathematical curve to combined location measurement data between each pair of adjacent choke points. The fitted and combined location measurement data are stored as the digital representation of the transportation network.

According to at least some example embodiments, decision points are points at which the clusters of the location measurement data converge or diverge.

According to at least some example embodiments, examining of the plurality of clustered segments of the transportation network includes: combining the clustered segments to determine a mean path between adjacent ones of the created choke points.

According to at least one example embodiment, the choke point creation module is further configured to: cluster the location measurement data for location probes following a same path; determine decision points in the transportation network by comparing the clusters of location measurement data; and create choke points based on the clusters of location measurement data and the determined decision points. The plurality of maneuvers are generated by examining clustered segments of the transportation network between adjacent ones of the created choke points.

In at least one other example embodiment, the choke point creation module is further configured to: cluster the location measurement data for location probes following a same path; determine decision points in the transportation network by comparing the clusters of location measurement data; create choke points based on the clusters of location measurement data and the determined decision points; and fit a mathematical curve to combined location measurement data between each pair of adjacent choke points. The fitted and combined location measurement data are stored as the digital representation of the transportation network.

FIG. 1 is a block diagram detailing various component parts of a map database system.

Referring to FIG. 1, a navigation device (ND) 200 communicates with a geographic database management facility 104 through a communication network 110 and data network 112. The communication network 110 may be a wireless communications network 154 through a service provider (e.g., through a cellular network); a wireless communications network 154 through an area network (e.g., through a Wi-Fi hot spot or WiMAX); a wired connection to a computing facility 158 (e.g., as provided to a home personal computer); or the like.

In example embodiments, the data network 112 connected between the communications network 110 and the geographic database management facility 104 may be, for example, a local area network (LAN), personal area network (PAN), campus area network (CAN), Metropolitan area network (MAN), wide area network (WAN), global area network (GAN), internetwork, intranet, extranet and/or the Internet.

The communication network 110 is not limited to a particular communication technology. Additionally, the communication network 110 is not limited to a single communication technology; that is, the network 110 may include several communication links that use a variety of technologies. For example, the communication network 110 may be adapted to provide a path for electrical, optical, and/or electromagnetic communications. As such, the communication network 110 may include, but is not limited to, one or a combination of the following: electric circuits, electrical conductors such as wires and coaxial cables, fiber optic cables, converters, radio-frequency (RF) waves, the atmosphere, empty space, etc. Furthermore, the communication network 110 may include one or more intermediate devices such as routers, repeaters, buffers, transmitters, and receivers, for example.

In one illustrative arrangement, the communication network 110 may include telephone and computer networks. Furthermore, the communication network 110 may be capable of accommodating wireless communication, for example radio frequency, microwave frequency and/or infrared communication. Additionally, the communication network 110 may accommodate satellite communication.

The communication signals transmitted through the communication network 110 may include, for example: signals adapted for cellular communication technology such as Time Division Multiple Access (TDMA), Frequency Division Multiple Access (FDMA), Code Division Multiple Access (CDMA), Global System for Mobile Communications (GSM), etc. Both digital and analogue signals may be transmitted through the communication network 110. These signals may be modulated, encrypted and/or compressed signals as may be desirable for the communication technology.

Still referring to FIG. 1, the geographic database management facility 104 includes a collection facility 138. The collection facility 138 collects road characteristic and/or probe data from a plurality of navigation devices 200, or other non-navigation probe devices (e.g., truck monitoring systems for collection of probe data).

As discussed above, probe data may include sequential location measurements such as probe trace points. Probe trace points identify coordinates on the surface of the Earth, which are usually expressed in latitude, longitude and, possibly, altitude (e.g., in meters above sea level). The time at which these measurements were recorded may also be stored. From a sequential set of these measurements, heading, velocity and slope can be derived. Location measurements may be acquired periodically (e.g., every 5 seconds) by the navigation device 200.

Still referring to FIG. 1, acquired probe data is provided to a probe transportation segment geometry analysis facility 144. At the probe transportation segment geometry analysis facility 144, transportation network segment geometry and attributes are inferred from the collected probe data. A geometry and attribute compare unit 148 compares the inferred probe geometry and attributes with geometry and attributes stored in the geographic database 152 to detect and interpret differences. The geometry and attribute compare unit 148 generates alterations 150 that can be applied to both the geometry and attribution of the geographic database 152. In keeping with the above descriptions regarding the ability to generate geometry without reference to previous geometry, the geometry and attribute compare unit 148 may also be referred to as a geometry and attribute synthesis unit 148. In this example, the geometry and attribute synthesis unit 148 may compare other probe traces to a random probe trace determined to have been recorded while travelling a transportation segment of interest.

Ultimately, alterations 150 may be provided to the geographic database 152 and on to users as a part of an update to a local geographic database of, for example, navigation device 200.

Example embodiments may utilize probe vehicles equipped with sensors that collect information such as position, speed, heading, slope, time, and the like. The collected information may be used to infer changing conditions of transportation network 108 over time. In example embodiments, a system (such as the system shown in FIG. 1) may collect data from a plurality of probe vehicles traversing a transportation network 108 over a first period of time and compare this collected data to a plurality of vehicles traversing the same transportation network 108 over a second period of time.

The comparison may also be between the first set of data and data associated with the same transportation network, which is stored in geographic database 152. By comparing these two sets of data, changes in travel patterns may be used to infer changes in road conditions and/or road routings. For example, if drivers travel both North and South over the same or a closely similar locus of points (likely a road) during the first time period, but travel only North for the same locus of points during the second period of time, it may be inferred that a significant change has been made to the direction of travel allowed on the road (attribution) that represents this collection of data, and that the road has been made a one-way road. In another example embodiment, the comparing may be omitted by creating a new map based on the collected probe data for the segment. In this example, a seed or basic representation of the transportation network is not required.

In another example, if most vehicles merely slow before proceeding through a specific intersection during a first period of time, but most vehicles come to a complete stop during a second period of time, it may be inferred that a new stop sign has been placed at the intersection. By tracking vehicles over time, a geographic database provider may be provided a timelier indicator of changes in the transportation network 108, which may lead to more timely changes in the geographic database 152 and/or a new geographic database 152. These changes may enable user updates and or new maps that better reflect the current state of a transportation network 108.

Figure 2:
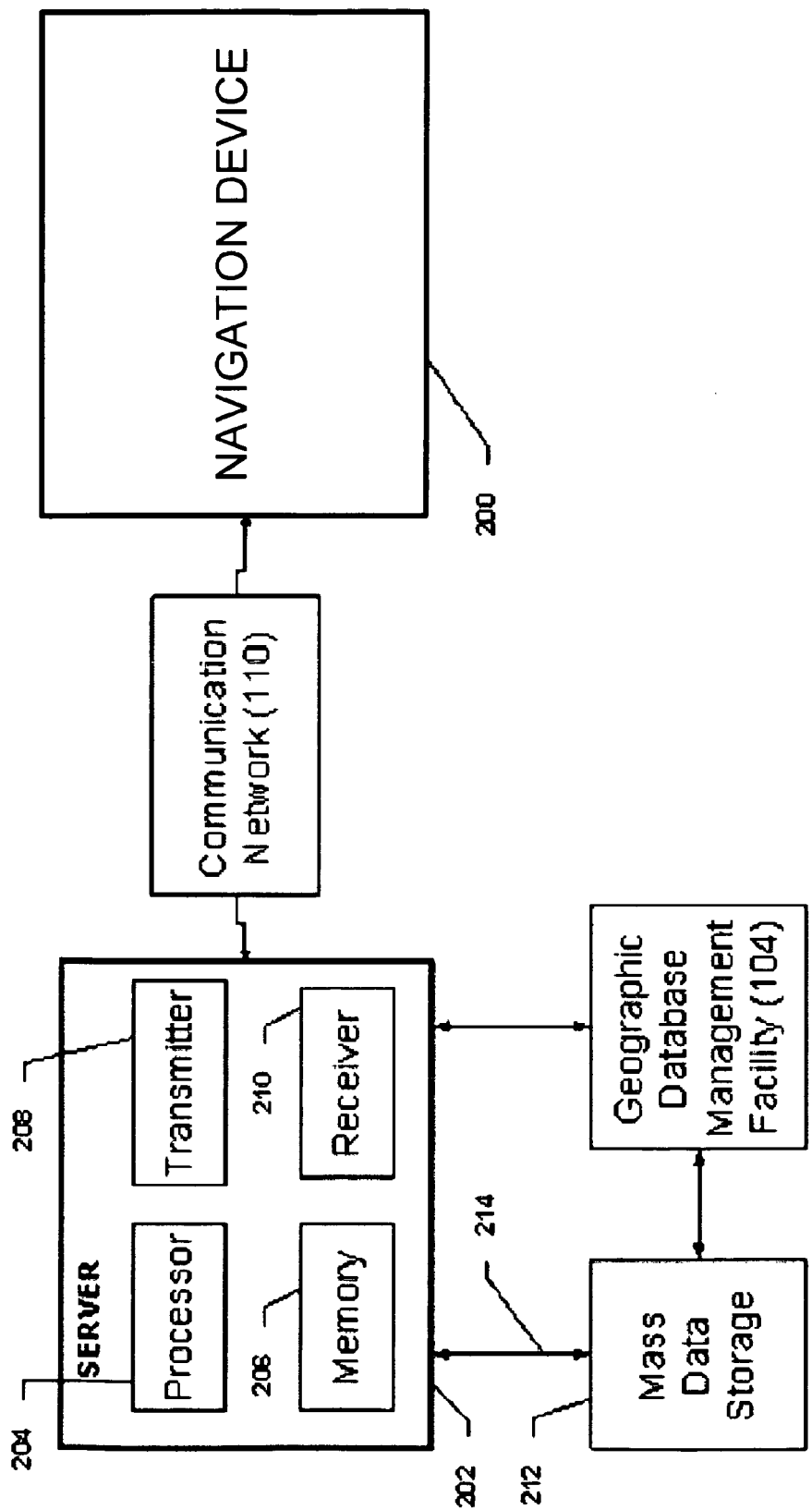
FIG. 2 is a schematic illustration of the manner in which a navigation device may receive or transmit information over a wireless communication channel.

FIG. 2 is a schematic illustration of an example manner in which a navigation device transmits or receives information over a wireless communication channel.

Referring to FIG. 2, the navigation device 200 may establish a "mobile" or telecommunications network connection with a server 202 via a mobile device (e.g., a mobile phone, PDA, and/or any device with mobile phone technology), which is not shown. In so doing, the navigation device 200 may establish a digital connection (e.g., a digital connection via known Bluetooth technology) with the mobile device. Thereafter, the mobile device can establish a network connection (through the Internet for example) with the server 202 through a network service provider. Through the "mobile" network connection, the navigation device 200 and the server 202 may exchange "real-time" or at least very "up to date" information via communication network 110.

The establishing of the network connection between the mobile device (via a service provider) and another device such as the server 202, using the Internet, for example, may be done in a known manner. This may include use of TCP/IP layered protocol for example. The mobile device may utilize any number of communication standards, for example CDMA, GSM, WAN, GPRS (General Packet Radio Service), GSRM, etc.

The navigation device 200 may include mobile phone technology within the navigation device 200 itself (including an antenna or optionally using the internal antenna of the navigation device 200). The mobile phone technology within the navigation device 200 may include internal components as specified above, and/or may include an insertable card (e.g., Subscriber Identity Module (SIM) card), complete with necessary mobile phone technology and/or an antenna for example. As such, mobile phone technology within the navigation device 200 may similarly establish a network connection between the navigation device 200 and the server 202, via the Internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information may be updated.

In FIG. 2 the navigation device 200 is depicted as being in communication with the server 202 via a generic communication network 110 that may be implemented by any of a number of known arrangements.

The server 202 includes a receiver 210 configured to receive sequential location measurements (e.g., probe trace points) from the navigation device 200. The server 202 further includes a processor 204 configured to, inter alia, determine a baseline based on the sequential location measurements along the at least one navigable feature, sort and cluster the sequential location measurements into a plurality of location measurement groups that are along the baseline, and determine a geometric feature of the at least one navigable feature based on distributions of sequential location measurements.

The processor 204 is operatively connected to a transmitter 208, the receiver 210 and a memory 206. The transmitter 208 and the receiver 210 transmit/receive information to/from the navigation device 200 via the communication network 110. The signals sent and received may include, for example, data, communication, and/or other propagated signals. Although described separately, the functions of the transmitter 208 and the receiver 210 may be combined into a signal transceiver.

The processor 204 is also operatively connected to a mass data storage device 212 via a wired or wireless connection 214. The mass storage device 212 may contain a store of navigation data and map information, and may be a separate device from the server 202. Alternatively, the mass data storage device 212 may be incorporated into the server 202. The server 202 is further connected to (or includes) the geographic database management facility 104 described above with regard to FIG. 1.

The navigation device 200 may be adapted to communicate with the server 202 through the communication network 110, and may include at least a processor and a memory as described in more detail below with regard to FIG. 3.

Software stored in the memory 206 may provide instructions for the processor 204 and may allow the server 202 to provide services to the navigation device 200. One service provided by the server 202 may involve, for example, processing requests from the navigation device 200 and transmitting navigation data from the mass data storage 212 to the navigation device 200. Another service provided by the server 202 may include, for example, processing the navigation data using various algorithms for a desired application and sending the results of these calculations to the navigation device 200.

The server 202 may include a remote server accessible by the navigation device 200 via a wireless channel. The server 202 may include a network server located on, for example, a local area network (LAN), wide area network (WAN) and/or virtual private network (VPN). More specifically, for example, the server 202 may include a personal computer such as a desktop or a laptop computer. The communication network 110 may be a cable connected between the personal computer and the navigation device 200. Alternatively, a personal computer may be connected between the navigation device 200 and the server 202 to establish an Internet connection between the server 202 and the navigation device 200. Alternatively, a mobile telephone or other handheld device may establish a wireless connection to the internet, for connecting the navigation device 200 to the server 202 via the internet.

The navigation device 200 may be provided with information from the server 202 via information downloads, which may be periodically updated automatically or upon a user connecting navigation device 200 to the server 202 and/or may be more dynamic upon a more constant or frequent connection between the server 202 and navigation device 200 via a wireless mobile connection device and TCP/IP connection, for example. For many dynamic calculations, the processor 204 may handle the bulk of the processing needs. However, the processor 510 of navigation device 200 (shown in FIG. 3) may also handle processing and calculation, often times independent of a connection to server 202.

The navigation device 200 may also provide information to server 202. For example, navigation device 200 may include hardware and/or software (described in more detail below with regard to FIG. 3) configured to provide probe data to the geographic database management facility 104 via, for example, communication network 110 and server 202.

Figure 3:
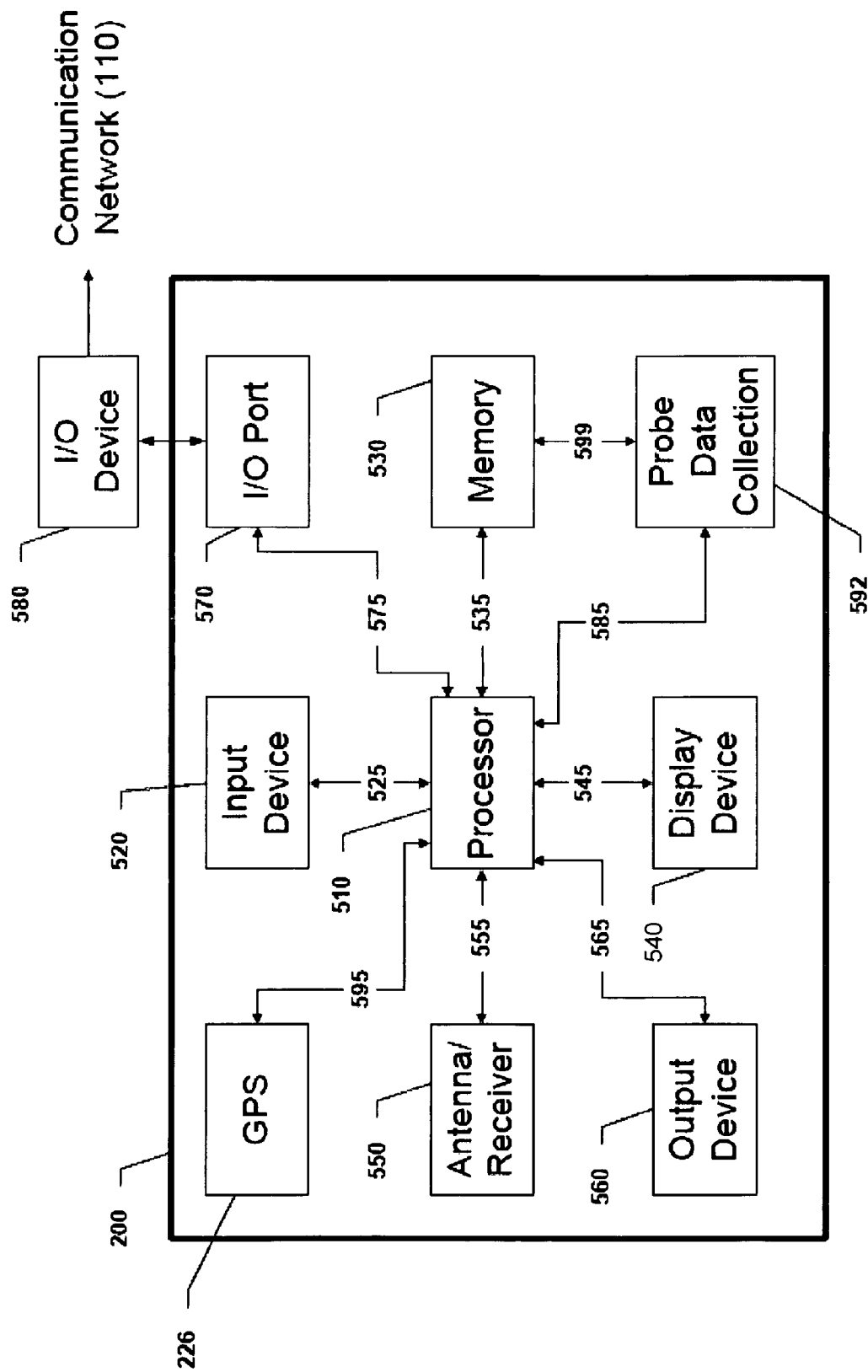
FIG. 3 is a schematic illustration of a navigation device according to an example embodiment.

FIG. 3 is a block diagram illustrating a navigation device according to an example embodiment in more detail. It should be noted that the block diagram of the navigation device 200 is not inclusive of all components of the navigation device, but is only representative of some example components.

The navigation device 200 includes a processor 510 connected to an input device 520 and a display screen 540. The input device 520 can include a keyboard device, voice input device, touch panel and/or any other known input device for inputting information. The display screen 540 can include any type of display screen such as an LCD display, for example. In an example arrangement, the input device 520 and display screen 540 are integrated into an integrated input and display device, including a touchpad or touch screen input so that a user need only touch a portion of the display screen 540 to select one of a plurality of display choices or to activate one of a plurality of virtual buttons.

The navigation device may include an output device 560, for example an audible output device (e.g., a loudspeaker). Input device 520 can include a microphone and software for receiving input voice commands.

Still referring to FIG. 3, the processor 510 is operatively connected to and configured to receive information from the input device 520 via a connection 525. The processor 510 is also operatively connected to at least one of display screen 540 and output device 560, via output connections 545 and 565, respectively. Further, the processor 510 is operably coupled to a memory resource 530 via connection 535 and is further adapted to receive/send information from/to input/output (I/O) ports 570 via connection 575. The I/O port 570 may be connected to an I/O device 580 external to the navigation device 200.

The memory 530 may include, for example, a volatile memory (e.g., Random Access Memory (RAM)) and a non-volatile memory (e.g., a digital memory, such as a flash memory). The external I/O device 580 may include an external listening device such as an earpiece or the like. The connection to I/O device 580 can further be a wired or wireless connection to any other external device such as a car stereo unit for hands-free operation and/or for voice activated operation for example, for connection to an ear piece or head phones, and/or for connection to a mobile phone.

FIG. 3 further illustrates an operative connection between the processor 510 and an antenna/receiver 550 via connection 555. In one example, the antenna/receiver 550 may be a GPS antenna/receiver. The antenna and receiver designated by reference numeral 550 are combined schematically for illustration. But, the antenna and receiver may be separate components. The antenna may be a GPS patch antenna or helical antenna for example.

The navigation device 200 may use embedded GPS receiver 226 to determine current data (e.g., position, speed, heading, slope, etc.) associated with the navigation device 200. GPS receiver 226 is connected to processor 510 via connection 595. This data, in combination with a local geographic database (e.g., stored in memory 530), may be used to provide a user of the navigation device 200 with information associated with their current travel conditions. This information may include, for example: location in relation to a stored map in the local geographic database; estimated time of arrival given a destination; location of proximate points of interest and information thereof. The probe data collection facility 592 may collect said information from the navigation device 200 and local geographic database over a period of time, and either store the information for later transmission, or transmit the information real-time through the navigation device's 200 communication system, for example, via I/O device 580 and communication network 110. The probe data collection facility 592 is connected to the processor 510 via connection 585. The probe data collection facility 592 is also connected to the memory 530 via connection 599.

The portable or handheld navigation device 200 of FIG. 3 can be connected or "docked" in a known manner to a vehicle such as a bicycle, a motorbike, a car or a boat, for example. Such a navigation device 200 is then removable from the docked location for portable or handheld navigation use.

Figure 4:
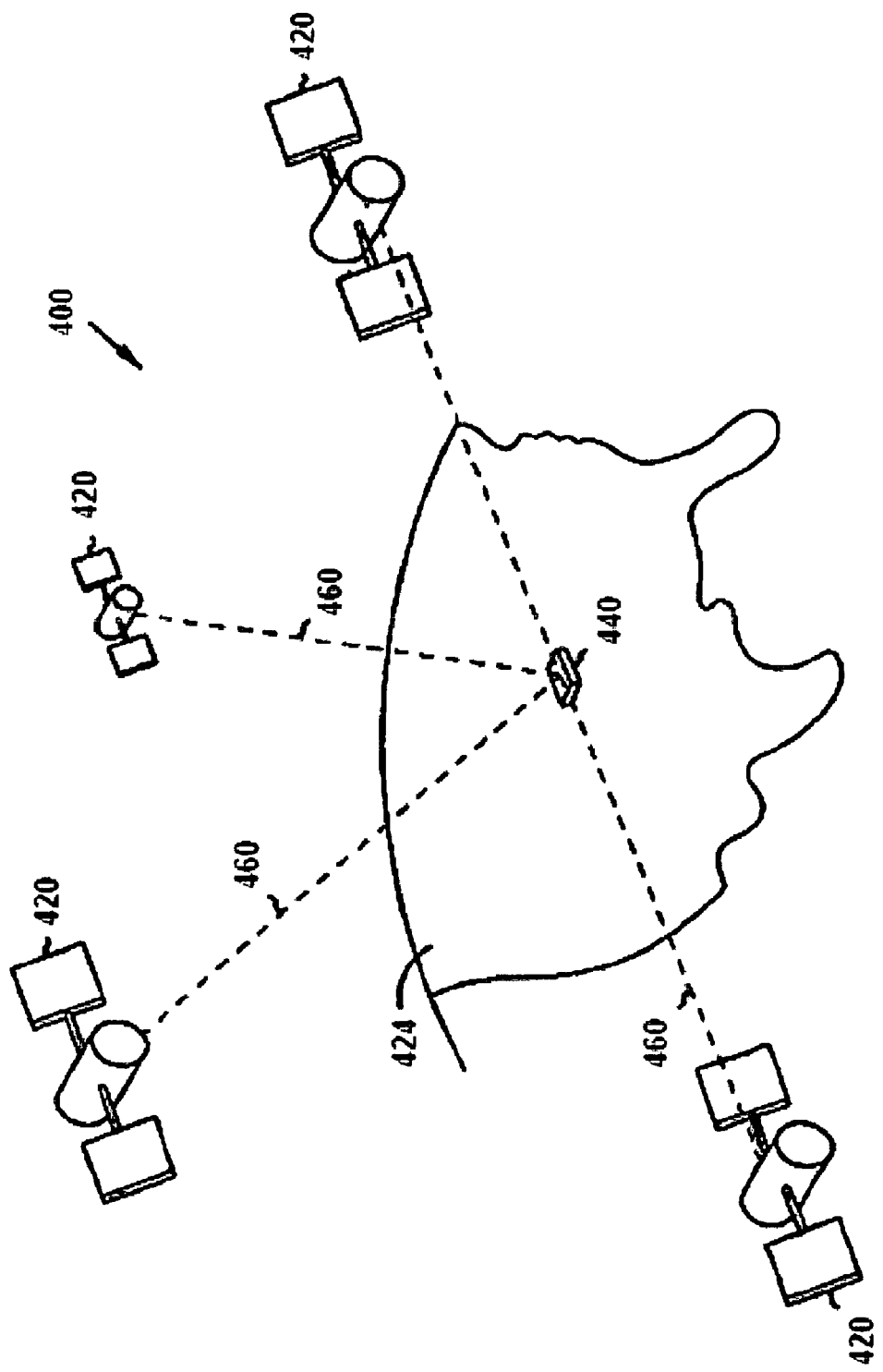
FIG. 4 is a schematic illustration of a Global Positioning System (GPS)

FIG. 4 illustrates an example Global Positioning System (GPS), usable by navigation devices according to example embodiments. Such systems are known and used for a variety of purposes. In general, GPS is a satellite-radio based navigation system capable of determining continuous position, velocity, time, and in some instances, direction information for an unlimited number of users. Formerly known as NAVSTAR, GPS incorporates a plurality of satellites, which orbit the earth in extremely precise orbits. Based on these precise orbits, GPS satellites can relay their location to any number of receiving units. Because GPS is generally known, only a brief discussion will be provided herein.

GPS is implemented when a device, specially equipped to receive GPS data, begins scanning modulation codes for GPS satellite signals. Upon synchronizing to a radio signal from a GPS satellite, the device determines the precise location of that satellite via one of a plurality of different conventional methods. In most instances, the device continues scanning for signals until acquiring at least four different satellite signals (it is noted, however, that position is not normally, but can be determined with only three signals using other triangulation techniques). Implementing geometric triangulation, the receiver utilizes the four known positions to determine its own three-dimensional position relative to the satellites. This can be done in any known manner. The position and velocity data can be updated in real time on a continuous basis by an unlimited number of users.

Referring to FIG. 4, the GPS system 400 includes a plurality of satellites 420 orbiting the Earth 424. The orbit of each satellite 420 is not necessarily synchronous with the orbits of other satellites 420 and, in fact, is likely asynchronous. A GPS receiver 440 is shown receiving spread spectrum GPS satellite signals 460 from the various satellites 420.

The spread spectrum signals 460, continuously transmitted from each satellite 420, utilize a highly accurate frequency standard accomplished with an extremely accurate atomic clock. Each satellite 420, as part of its data signal transmission 460, transmits a data stream indicative of that particular satellite 420. It is appreciated by those skilled in the relevant art that the GPS receiver device 440 generally acquires spread spectrum GPS satellite signals 460 from at least four satellites 420 for the GPS receiver device 440 to calculate its three-dimensional position by triangulation.

As noted above, although example embodiments are described herein with regard to GPS, other Global Navigation Satellite Systems (GNSSs) or non-GNSS systems (e.g., inertial indoor systems may be used. For example, GNSSs such as GLONAS, Galileo, Compas, etc. may be used.

FIG. 5 shows a portion of a map including maneuvers AC and BC. In this example, the maneuvers AC and BC traverse an intersection (a decision point).

As shown in FIG. 5, each of maneuvers AC and BC have the same geometry after merging and when approaching point C. That is, for example, the geometry for both maneuvers AC and BC after the intersection is duplicated or coincident while they approach point C. However, in this representation the two maneuvers are distinct until after the physical merging of the roads, well beyond the point at which a traditional map representation would merge the roads.

The resolution of the digital transportation network database including a particular maneuver may affect the instantiation of the maneuver. The instantiation of the maneuver refers to the actual labeling of a maneuver. For example, the instantiation of a maneuver may refer to the same maneuver from a different 'view' (e.g., resolution).

If a digital transportation network database stores street centerlines only, but does not distinguish between lanes, only a single maneuver may exist from a first road (e.g., road A in FIG. 5) to a second road (e.g., road B in FIG. 5). At a higher (e.g., lane level) resolution, this same route may be composed of two maneuvers, for example, from the left lane of the first road to the left lane of the second road and from the right lane of the first road to the right lane of the second road.

Referring back to FIG. 5, for example, at lane level precision (e.g., in a network database that distinguishes between two adjacent lanes) individual maneuvers are stored for a vehicle course turning from lane 1 of road A to lane 1 of road B, and for a vehicle course from lane 2 of road A to lane 2 of road B, even though these maneuvers may be related.

As discussed briefly above, in an example in which the digital transportation network database distinguishes between adjacent lanes, a merge left into a new lane on a freeway may constitute a maneuver because many drivers choose this lane as it becomes available (e.g., there exists a pattern of behavior for the drivers). However, as also discussed above, a lane change at an arbitrary point on a highway may not represent a maneuver because there is no particular reason for multiple drivers to choose that particular location for a lane change.

There will also be maneuvers that are not in the database because they are not commonly executed (e.g., turn into the driveway, etc.) or simply not yet identified.

Figure 6:
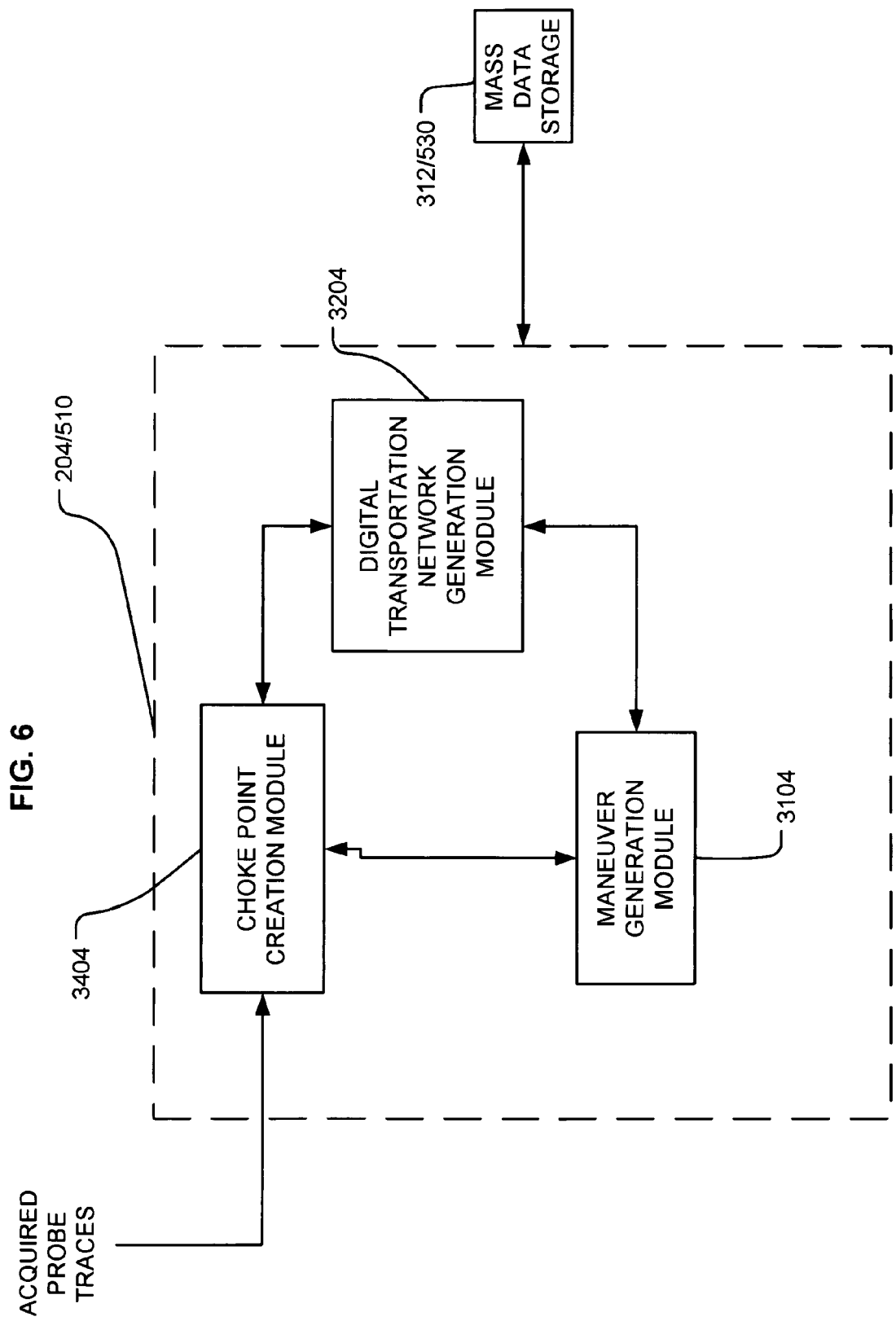
FIG. 6 illustrates an example embodiment of a processor 204/510 shown in more detail.

FIG. 6 is a block diagram illustrating an example embodiment of the processor 204 of FIG. 2 and/or the processor 510 shown in FIG. 3 in more detail. For the sake of clarity, the block diagram shown in FIG. 6 will be discussed in detail with regard to the processor 204/510.

As shown in FIG. 6, the processor 204/510 includes a choke point creation module 3404, a maneuver generation module 3104, and a digital transportation network generation module 3204, which are operatively connected to one another. Example operation of the processor 204/510 will be described in more detail in connection with the flow chart shown in FIG. 7.

Figure 7:
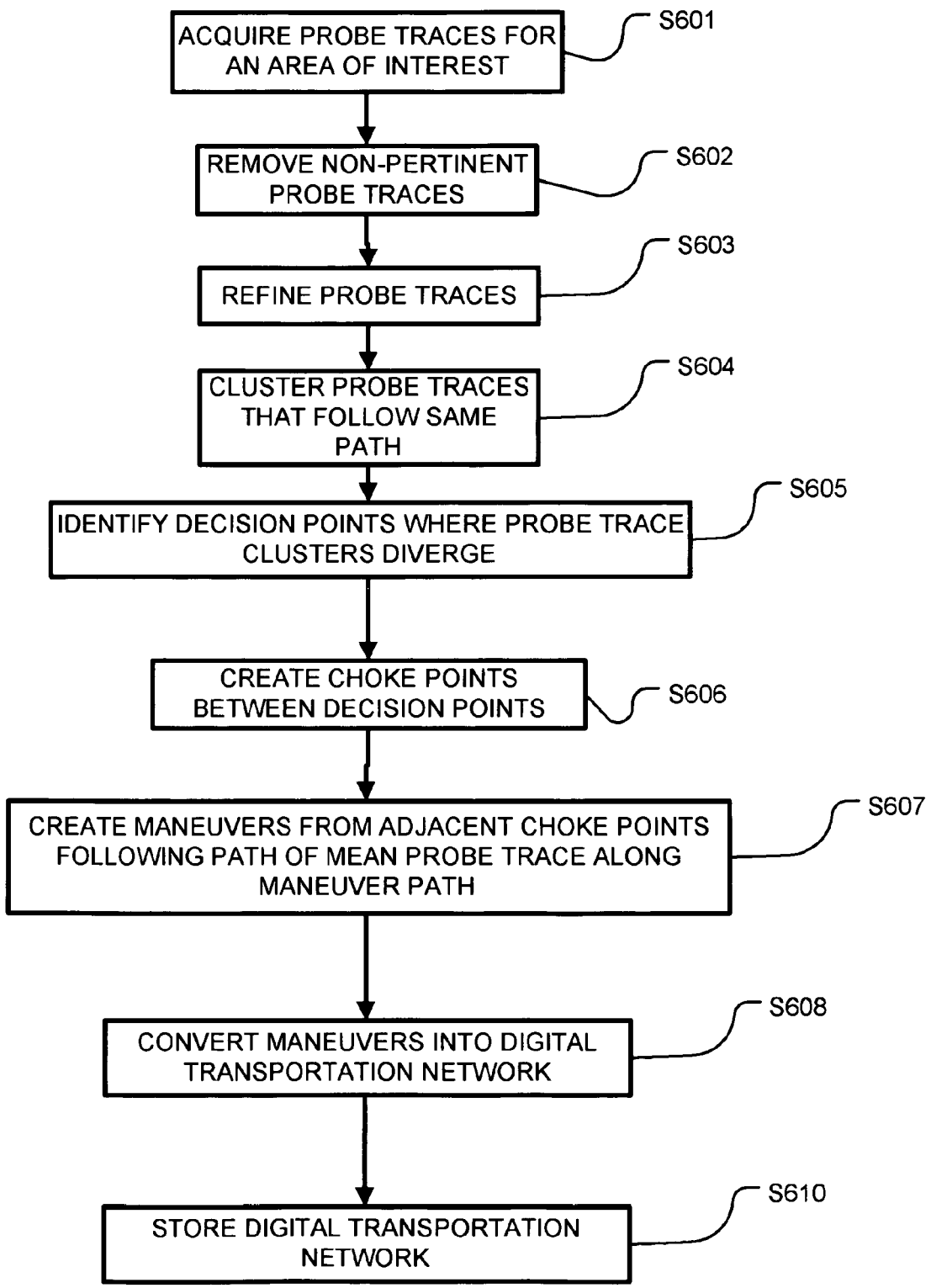
FIG. 7 shows a flow chart for illustrating an example embodiment of a method for creating and storing a digital transportation network.

FIG. 7 is a flow chart illustrating an example embodiment of a method for creating a digital transportation network.

Referring to FIG. 7, at S601 probe traces (sequential location measurement data) for an area of interest are acquired by location sensors (e.g., navigation devices 200). In one example, an area of interest may be represented by a geometry bounded by a minimum and maximum latitude and longitude where all probe traces that traverse within these extremes are analyzed collectively. The width and height of this geometry, at a minimum, encompasses at least one maneuver and more likely several maneuvers. An example area of interest may cover about 1 square mile in an urban area, where there are many transportation segments, and about 10 square miles in a rural area, where there are few transportation segments. The area of interest may be chosen for computational efficiency. Because methods for acquiring probe traces are generally known, a detailed discussion is omitted. In this embodiment, the acquired probe traces are transmitted to the server 202 (or other navigation devices). As discussed herein, the acquired probe traces (or probe data) is/are sometimes referred to as "sequential location measurement data." Also, navigation devices or probe vehicles are sometimes referred to as "location probes."

At S602, the choke point creation module 3404 removes probe traces or portions of probe traces in the area of interest that are not pertinent to the transportation network being built. In one example, the choke point creation module 3404 removes probe traces in a parking lot or driveway, which is not part of the network. In another example, the choke point creation module 3404 removes probe traces corresponding to a bicycle when the transportation network being built is for automobiles. Probe traces that are anomalous may also be removed. An example of this may be a probe vehicle going down a street known to be one-way in the opposite direction.

At S603, the choke point creation module 3404 refines the remaining probe traces.

As is generally known, low frequency and poor accuracy of probe measurements due to equipment limitations and environmental factors make a single probe trace an inadequate representation of a given transportation network segment. Location sensor resolution from a moving location probe (e.g., a vehicle or a pedestrian) can vary from +/−about 5 meters to well over about 10 meters for GPS and greater for other location determining devices. Further, most location sensors are adversely affected by obstacles such as tall buildings or tunnels in the way of a line-of-sight view of the reference for the location sensor. A GPS receiver, for example, must have an unrestricted view of several GPS satellites simultaneously for an accurate position reading.

By understanding the limitations of measurements and properties of the transportation network being modeled, the remaining probe traces may be refined to provide more usable data for modeling a transportation network. In one example, the choke point creation module 3404 refines the remaining probe traces by removing or cleaning up noisy traces where the accuracy is in question. An example is when a location probe is a GPS receiver and there are few satellites within line-of-site of the GPS receiver. However, there are methods to improve the accuracy of a probe trace acquired from a GPS receiver provided that additional information is known about the nature of the obstructions. Other example methods for refining probe traces include curve smoothing. However, methods for refining probe traces should not be limited to the methods described herein. Rather, any probe trace conditioning or refining method may be used.

Returning to FIG. 7, after refining the acquired probe traces at S603, then the choke point creation module 3404 bundles or clusters the probe traces following the same path at S604.

At 8605, the choke point creation module 3404 compares the various trace clusters to determine decision points. Decision points are points at which several probe traces following the same path (within a statistical error tolerance) diverge to one of several paths. The opposite is also true; that is, a decision point is a point at which multiple probe trace clusters (or clusters of sequential location measurement data) converge to a single cluster or path (within a statistical error tolerance). A choke point may be defined by any non-decision point that falls along a cluster of probe traces (or sequential location measurement data). Example decision points are: an intersection where you can go straight, turn right or left; a point or place at which an additional lane, which you can turn into, is added; etc.

At 8606, the choke point creation module 3404 compares the trace clusters in conjunction with decision points to identify or create choke points. As described above, choke points are non-decision points that fall along a cluster of probe traces. As also described above, the choke points may also serve as maneuver transition nodes at which one maneuver ends and one or more other maneuvers begin. According to at least some example embodiments, at 8606 the choke point creation module 3404 may create choke points or nodes according to known methods by an automated means (e.g., checking for areas of minimum probe variance); finding areas where all probe traces travel at the same or substantially the same speed and in the same or substantially the same direction (within statistical tolerances) or visually by a manual operator.

At S607, the maneuver generation module 3104 creates individual maneuvers by examining clustered segments between the identified choke points and determining a mean probe trace. In one example, the clustered segments between adjacent choke points are averaged to determine the mean probe trace (e.g., a centerline geometry) for the maneuver between the adjacent choke points. Attribution may also be gleaned from the probe traces between adjacent choke points. Example attributions may include: average travel speed; no left turn zones; and other traffic controls.

According to at least some example embodiments, there are two criteria for selecting a start/end point of a maneuver from the generated choke points: (1) the choke point is a local minimum in the variance of the heading of all the nearby probe traces; and (2) a clustering of the probe traces in (1) is isolated by a region of significantly fewer probe traces (relative to the number of probe traces that traverse decision points).

In one example, a choke point meeting the following conditions may be selected as a start or end point of a given maneuver:

1. There is more than one probe trace within a lateral distance of 10 meters of the choke point (e.g., about three times the variance (3σ) horizontally);
2. The lateral density of probe traces falls to less than about 10% of maximum in about a 5 meter wide interval of the point; and
3. At the choke point, a local maximum percentage of vehicle headings in the same or opposite direction (±about 10°) exists.

Locations meeting the above-identified criteria may be found by: (1) using spatial autocorrelation functions to identify spots with a significant number of points and sufficient autocorrelation; (2) using heading variance across all of the probe traces passing a given point; and/or (3) comparing the spatial density of points along two perpendicular lines to find a maximum difference to identify the point with the minimum falling (e.g., quickly falling) to zero.

Referring back to FIG. 5, for example, node C is at a location where the path of maneuvers AC and BC statistically converge. Thus, node C is an acceptable place for an end node.

Returning to FIG. 7, the digital transportation network generation module 3204 then incorporates the resulting maneuvers (e.g., directly) into a digital transportation network at S608. Alternatively, the digital transportation network generation module 3204 further processes the resulting maneuvers by combining portions of maneuvers connected at nodes from one decision point to an adjacent decision point. Also, the digital transportation network generation module 3204 may fit curves to the resulting polylines and store the curve, rather than the polylines, in the database.

At S610, the digital transportation network generation module 3204 stores the created digital representation of the transportation network (e.g., a digital transportation network database) in the mass storage device 312/530.

Figure 11:
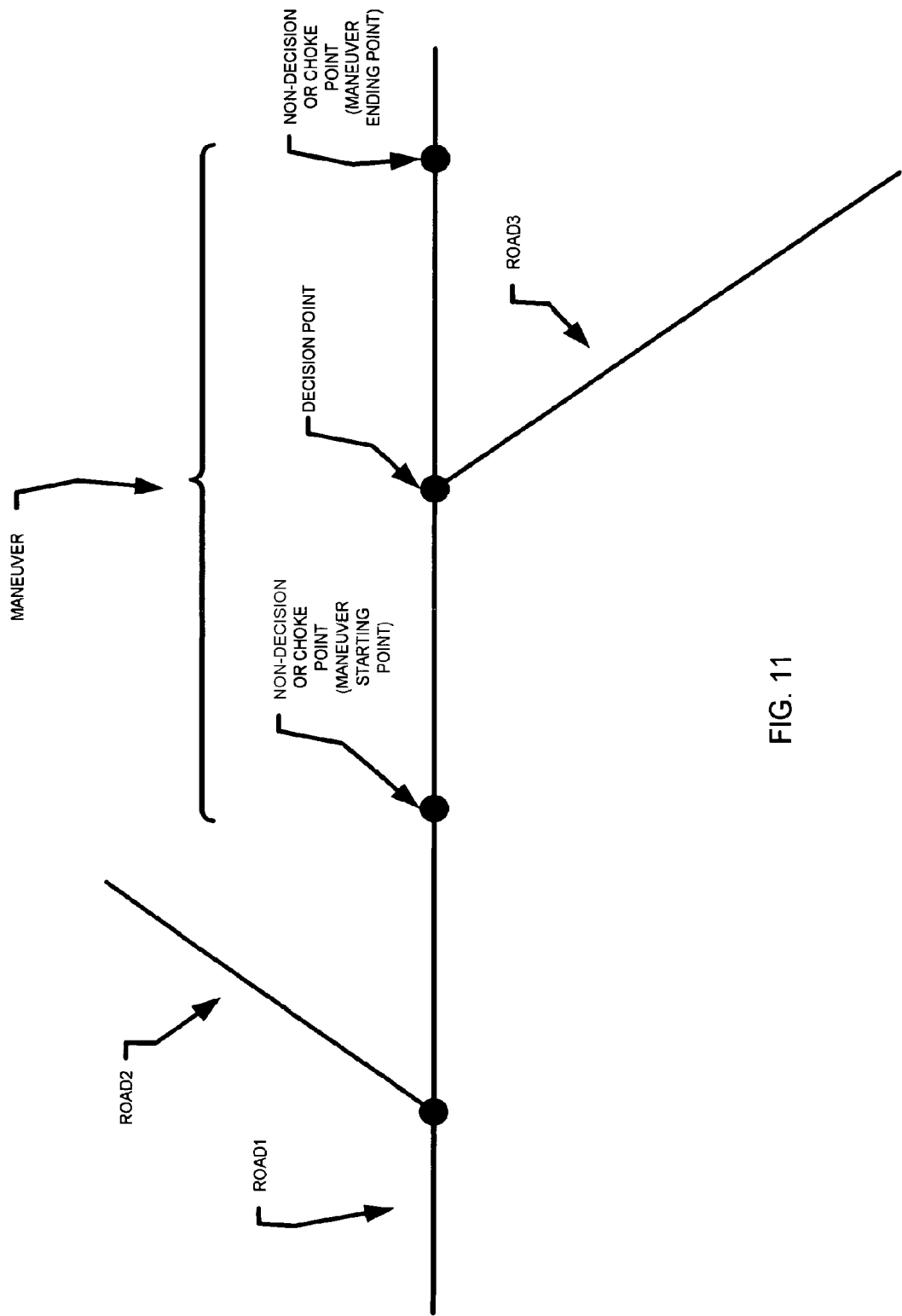
FIG. 11 is a simplified diagram showing an example transportation network segment including a maneuver according to an example embodiment.

FIG. 11 is a simplified diagram illustrating a transportation network segment including a maneuver according to an example embodiment.

Referring to FIG. 11, the transportation network segment includes three roads ROAD1, ROAD2 and ROAD3. Each of the roads intersect at a decision point, but the maneuver extends between two non-decision or choke points. Thus, each of the choke points serves as a start/end point of the maneuver shown in FIG. 11. The maneuver also traverses the decision point at which roads ROAD1 and ROAD3 intersect.

Figure 8:
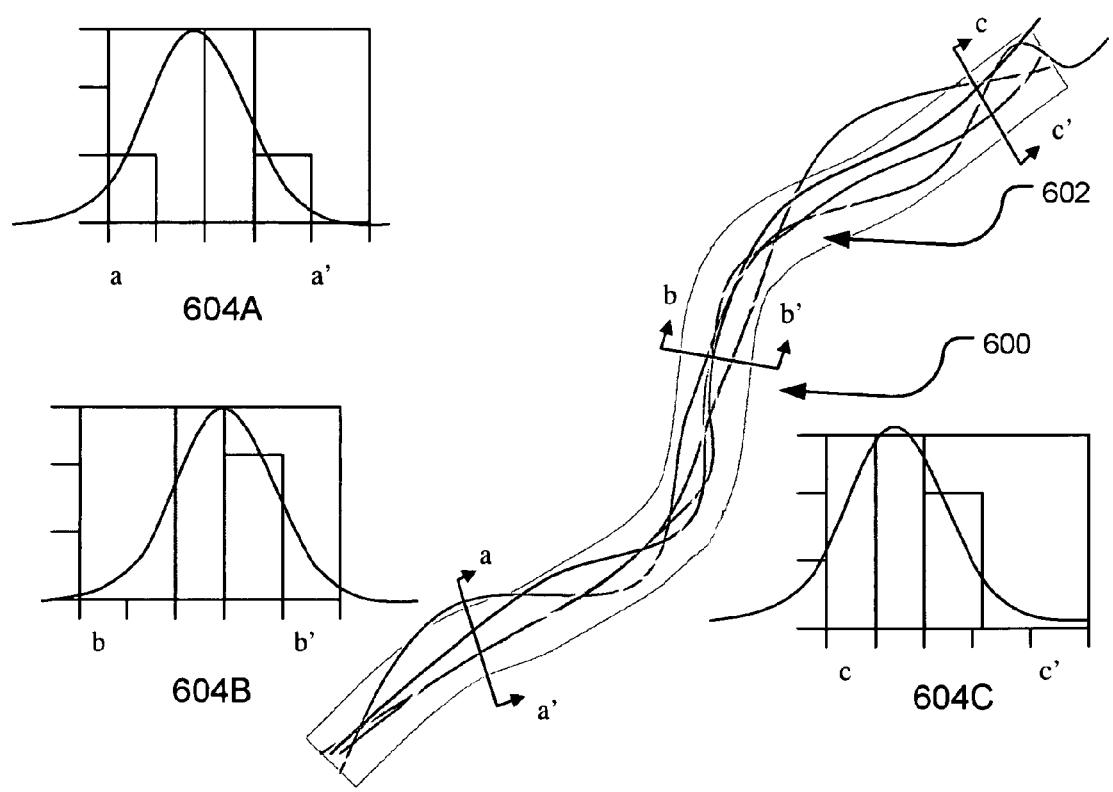
FIG. 8 illustrates example probe traces along a transportation network segment and corresponding cross-sectional graphs.

Moving forward, FIG. 8 illustrates example probe traces 602 along a transportation network segment 600. FIG. 8 also shows cross-sectional graphs 604A, 604B and 604C. The vertical axis on each of graphs 604A through 604C represents the relative frequency of probe trace crossings at discrete intervals along the transportation network segment 600.

As shown in graphs 604A through 604C, by fitting a normal distribution to the graphs 604A through 604C, the centerline of the transportation segment (or average probe trace)

may be inferred at the location of the peak of the distribution. Starting and ending points of maneuvers may be chosen at intervals along a transportation segment where probe traces converge with the least variability. For example, in FIG. 8, starting or ending points may be chosen along cross section b-b'. Another starting or ending point may be chosen on the other side of an intersection and a point of minimum probe trace convergence.

According to example embodiments, as new probe traces are acquired from navigation devices, the new probe traces may be included in the statistical analysis for determining maneuvers based on acquired probe traces. According to example embodiments, end nodes may be relocated/moved if the new probe data modifies the location of minimal variance among probe traces traversing particular paths of interest.

According to example embodiments, end nodes of a particular maneuver intersect zero, two or more other maneuvers both spatially and vertically. However, if only two maneuvers intersect at a particular end node, the two intersecting maneuvers may be combined.

A maneuver definition may vary depending on the specification for the digital transportation network. For example, a single maneuver may represent a single lane, a multiple lane highway, or a two-way road. Probe traces utilized to generate an average probe trace are selected according to the level of precision required by the data model. For example, in a maneuver model that models individual lanes, all probe traces travel in the same direction.

FIG. 9 shows an example of a two lane road with probe traces passing in both directions. FIG. 9 also shows graphs of the frequency of probe traces as a function of distance perpendicular to the direction of travel. In this example, the centerline is placed at the median of the distribution of all probe traces. For a data model having a separate line representing each direction of travel, the distribution of probe traces used to determine the average probe trace is filtered by direction of travel or a multi-modal distribution is split.

Still referring to FIG. 9, all probe traces traveling in both directions may be used for a transportation model depicting the centerline of a road. In a transportation model depicting individual lanes, probe traces may be singled out by direction of travel or separation of probe traces in a multi-modal distribution.

Probe traces used in generating a maneuver may also be partitioned based on vehicle type. That is, for example, a bus may be able to use different lanes than a passenger car.

According to at least one other example embodiment, the maneuver generation module 3104 shown in FIG. 6 may fit a maneuver as will be discussed in more detail below.

In this example embodiment, for each adjacent pair of start/end points with more than two probe traces in common, the maneuver generation module 3014 fits a curve to all of the probe traces between the two points. The maneuver generation module 3014 then computes the lateral offset of each of the probe traces from the fit curve at standard intervals. Based on the lateral offsets, the maneuver generation module 3104 computes the standard deviation of the lateral offsets. The maneuver generation module 3104 also computes a standard deviation of heading angles at each interval. If the computed standard deviation of the lateral offsets or the standard deviation heading increases by a given or predetermined factor from one interval to the next (between adjacent pairs of start/end points), the maneuver generation module 3014 searches for multiple paths between the start/end points.

At the point of maximum offset variance, the maneuver generation module 3014 checks for a bimodal distribution of lateral offsets. The maneuver generation module 3014 then groups two sets of probe traces and fits each group. If the fit to the two curves is better, the maneuver generation module 3104 inserts a start/end point on one (or both) of the groups according to a known start/end point insertion procedure. The maneuver generation module 3104 may then repeat the above-described maneuver fitting procedure for each pair of adjacent start/end points.

When determining whether to add a new node to the database (e.g., if two separate maneuvers have been captured as a single maneuver), it may be determined that a single maneuver should be split apart into two separate maneuvers.

To ensure that the above-described fits are consistent with other fits, the maneuver generation module 3104 may perform the following method. This method may serve as a check on the quality and/or consistency of the representation, as well as identifying locations where the maneuvers may be poorly specified.

Once a curve has been fit to a maneuver, data from the various probe traces may be associated back to the curve, and distributions perpendicular to the curve may be generated at intervals along the curve.

Data mapped from the probe trace points to the curve include, for example: distance along the curve; time of observation; lateral offset of observation; trace and point indices to re-associate the trace data; and/or other observational data. In one example, other observational data includes: GPS quality, communications quality, data from vehicle bus, etc.

This effectively translates the probe data from latitude/longitude coordinates into an along track and cross track (linear) reference system.

A lane on a modern, high speed road is generally about 3 to 4 meters in width, which is comparable to the resolution of the probe data. However, OEM installations are generally more accurate, whereas PNDs are less accurate, and cell phones are even less accurate. By examining the lateral distribution of probe data, the number of lanes in a road may be determined. As positioning systems become more accurate (e.g., with the availability of GLONASS, Galileo, COMPAS, etc.), such information becomes more usable.

Several maneuvers may be present in a road segment approaching an intersection. A prediction of a vehicle's future path may be made based on a match with each of the possible maneuvers. Statistical measures of the separation may also be available to compute probabilities for each of the possible maneuvers.

Without having the context of maneuvers, locally discriminating between probe traces of vehicles on one maneuver trajectory and probe traces of vehicles on another maneuver trajectory may not be possible. Example embodiments provide the ability to measure offsets of vehicles intending to make a particular maneuver from those making another maneuver. This ability becomes more available in vehicles due to increases in positioning system performance, including the inclusion of lane trackers on many vehicles, which provide a fiducial for lane offsets.

Figure 10:
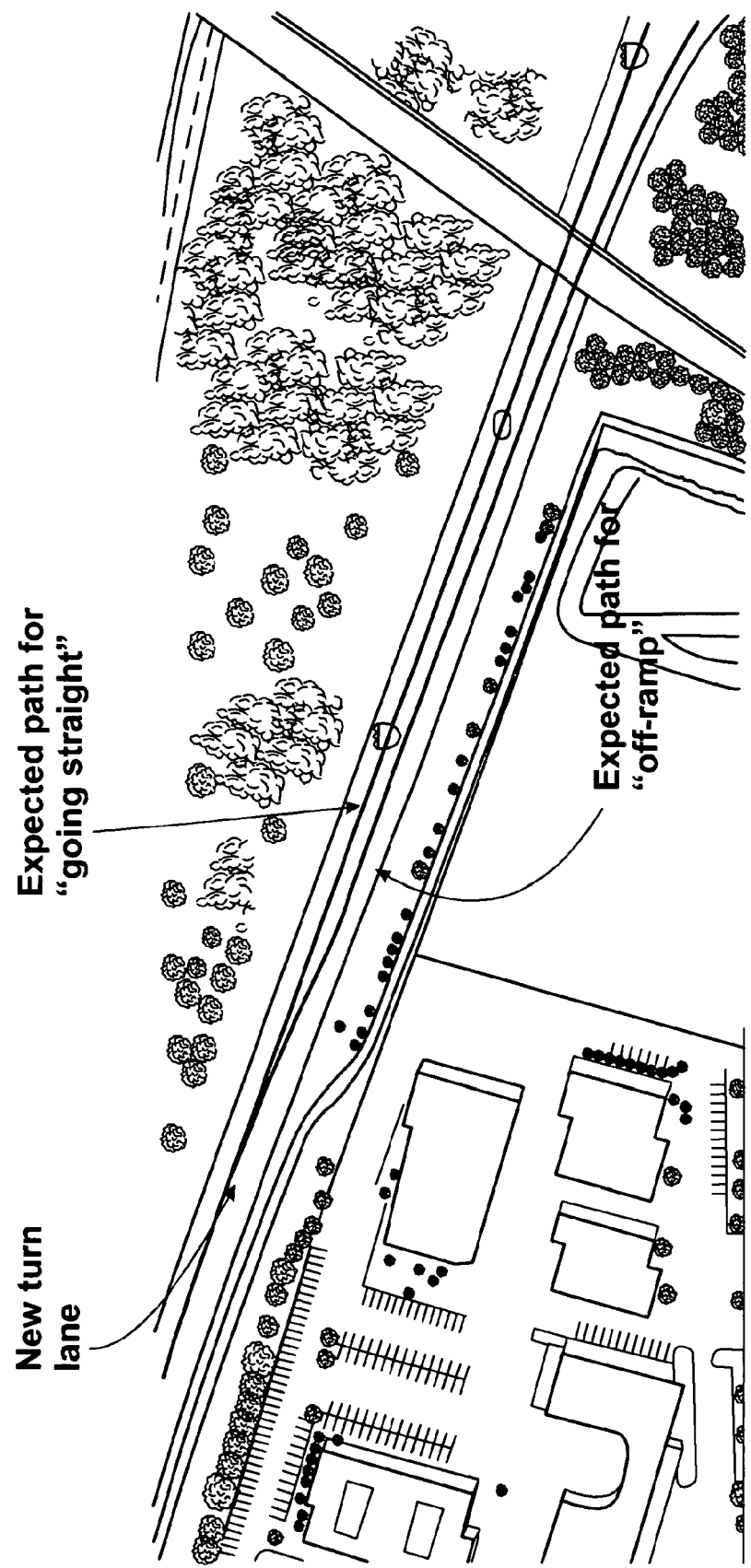
FIG. 10 shows expected data from a 'going straight' and 'off-ramp' maneuver.

FIG. 10 shows expected data from a 'going straight' and 'off-ramp' maneuver. In this example, offsets may be calculated relatively easily and used in path prediction at the bifurcation.

Figure 12:
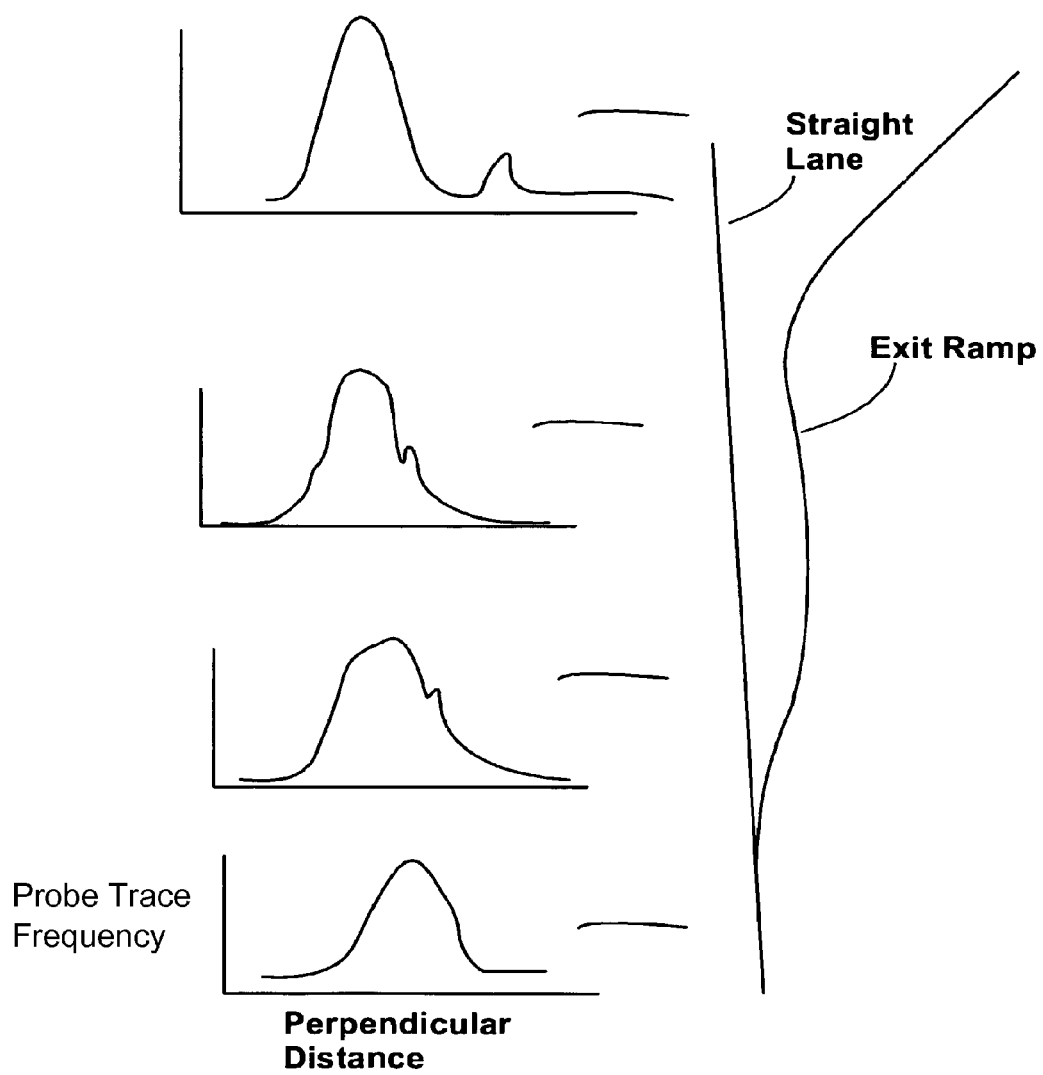
FIG. 12 shows an example distribution change from a single normal distribution prior to an off-ramp to a more bimodal distribution.

As shown in FIG. 9 and FIG. 12, by evaluating the distribution of probe trace frequency perpendicular to the direction of travel where an off-ramp is expected, it may be possible to observe the distribution change from a single normal distribution prior to the off-ramp to a more bimodal distribution where the tails of the two distributions are merged between the lane and the off-ramp, then finally two completely separate distributions—one for the ramp separate from the straight lane. The frequency of probe traces near the mean (e.g., the height of the bimodal curves is a relative function of how many vehicles turn off versus how many go straight (as shown in FIG. 12, more cars go straight than turn off).

Example embodiments may be implemented or utilized in conjunction with curve speed warning systems. Algorithms in conventional curve speed warning systems are generally based on exceeding some predicted level of lateral acceleration based on a vehicle's speed (and possibly acceleration) along with a radius of curvature for the road ahead as derived from ADAS map geometry. In many cases, the warning speed generated by such a conventional algorithm does not accurately represent the commonly traveled speed either because the geometry in the map database is incorrect or due to other alignment factors such as the slope or bank of the road.

Probe data described herein may be used to derive average speed(s) as a function of distance(s) along road(s). The function for a given road may be different on a road that is approaching an intersection, or more specifically a highway off ramp. This probe data provides a value for the accepted speed in the curve ahead as well as percentile values, which may be more appropriate to associate with a particular driver's preferences. The speed of a vehicle leading into a curve may also serve as an indicator for path prediction.

Maneuver based representations according to example embodiments may be implemented or utilized in ADAS applications. ADAS applications may utilize this information, in combination with other sensor data, to provide feedback to the driver or actuators on any deviations from appropriate behavior of a vehicle at a particular geographic point. A probe trace based map represents the historical behavior of monitored probe vehicles at a particular geographic point. Because humans are generally good drivers, someone who drives that historical average should be a relatively good driver. In addition, probe trace statistics enable ADAS systems to quantify deviations from the norm. When matched with a driver profile (e.g., their expected deviation), a highly personalized ADAS system may be generated.

Traffic controls may also be derived from the speed and stopping behavior of vehicles approaching an intersection in combination with higher level logic about relationships between traffic controls at the intersection. Lights, stop signs and/or yields may be distinguished with sufficient data.

Conventional transportation network representations describe road geometry in terms of linear features connecting nodes where other linear features intersect. These map representations attempt to represent the paint on the asphalt because the paint is the only easily observed feature available to the mapmaker. Conventional transportation network representations simplify roads by combining lanes in both directions into a single line. This generally corresponds with the way people design, build, name, number, and think about streets.

But, this conventional method of transportation network creation does not correspond particularly well with the way people drive or with the data collected by probe vehicles, which represents those behaviors. In general, a driver at an intersection is not trying to follow the paint on the road and does not drive the speed limit. Generally, a driver attempts to drive to a spot about two seconds in front of the vehicle. These spots are very different for drivers approaching an intersection, which is captured in maneuver representations according to example embodiments, but lost in conventional representations.

There is an active debate within the ADAS community over the value of 'paint' versus 'behavior' representations. This is exemplified by the stop sign problem. In most areas, the law states that a vehicle should stop at the line on the road associated with a stop sign. However, this is generally not what most people do. The dilemma in designing a stopping assistance system is where to stop the car. The legal interpretation may be unpopular with drivers because it is relatively unnatural and prone to errors where the paint structure is complex (as interpreted by a vehicle based camera system). While a determination as to the preferred representation (e.g., paint versus behavior representation) has yet to be made, the general approach seems to be to avoid the question by focusing on saving lives and ignoring the legal issues.

This same thorough process may also be extended to splits and merges in lanes, speed warnings, and other driving issues.

Example embodiments may also be utilized as a lower layer function used primarily for ADAS types of applications in addition to using conventional representations for many of the current functions.

Simplification of probe data processing may increase the quality of the resulting digital transportation network. Moreover, simplification of probe data processing may also increase the consistency of the data because all data between the two leftover ends will be processed and/or continuity may be improved.

Methods according to example embodiments described above may be implemented in the form of a device, such as a server and/or a navigation device. Thus, such aspects are encompassed within at least one example embodiment of the present application.

Further, although some example embodiments are described separately it will be understood that these embodiments may be combined into one or more other embodiments.

Further, at least one of the methods of at least one embodiment may be implemented as a sequence of instructions which, when executed by a processor (such as the processor 204 of the server 202, and/or the processor 510 of the navigation device 200, for example), causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium and/or optical medium.

Even further, any of the aforementioned methods may be embodied in the form of a computer program. The computer program may be stored on a computer readable media and is adapted to perform any one of the aforementioned methods when run/executed on a computer device (a device including a processor). Thus, the storage medium, computer readable medium, or computer readable storage medium is adapted to store information and is adapted to interact with a data processing facility or computer device to perform the method of any of the above mentioned embodiments.

As one of ordinary skill in the art will understand upon reading the disclosure, the electronic components of the navigation device 200 and/or the components of the server 202 may be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk and C++, and the programs can be structured in a procedural-orientation using a procedural language including but not limited to COBAL and C. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction with a navigation device.

Further, elements and/or features of different example embodiments may be combined with each other and/or substituted for each other within the scope of this disclosure and appended claims.

Still further, any one of the above-described and other example features may be embodied in the form of an apparatus, method, system, computer program and computer program product. For example, any of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope, and all such modifications as would be obvious to one skilled in the art are intended to be included within the scope of the following claims.

What is claimed is:

1. A method for determining features of a digital representation of a transportation network, said features comprising geometry of the transportation network and attributes associated therewith, the method comprising:
    acquiring, from one or more location sensors, a plurality of probe trace data for an area of interest, said probe trace data comprising a series of sequential location measurements acquired by said one or more location sensors;
    determining, by a processor, a plurality of choke points in relation to the probe trace data, each of said choke points comprising a non-decision point falling between adjacent decision points in said probe trace data;
    generating, by the processor, a plurality of maneuvers from said probe trace data, each of said maneuvers comprising a mean path of probe trace data from the plurality of probe trace data that traverses the same path between adjacent choke points;
    determining, by the processor, features of the digital representation of the transportation network based on the plurality of maneuvers;
    updating, by the processor, the digital representation of the transportation network by storing the determined features, wherein geometry of the transportation network in the updated digital representation is stored as a series of the plurality of maneuvers; and
    providing, by the processor, the updated digital representation for use by one or more of a navigation device and an advanced driver assistance system (ADAS).

2. The method of claim 1, wherein each of the decision points is a point at which probe trace data from the plurality of probe trace data following a same path diverges to one of several paths, or a point at which probe trace data from the plurality of probe trace data following one of several paths converges to a single path.

3. The method of claim 1, wherein the geometry of the digital representation of the transportation network is stored as a polyline representation of the plurality of maneuvers.

4. The method of claim 3, wherein the transportation network is a vehicle network in which a maneuver represents a single lane of street segments, the street segments including a plurality of lanes.

5. The method of claim 1, wherein the geometry of the digital representation of the transportation network is stored as a mathematical curve representation of the plurality of maneuvers.

6. The method of claim 5, wherein the transportation network is a vehicle network in which a maneuver represents a single lane of street segments, the street segments including a plurality of lanes.

7. The method of claim 1, wherein the choke points are associated with characteristics of the probe trace data, the characteristics including relative accuracy of the probe trace data and at least one of direction of movement, speed, and type of location probe from which the probe trace data are taken.

8. The method of claim 1, further comprising:
    clustering the probe trace data for location probes following a same path;
    determining decision points in the transportation network by comparing the clusters of probe trace data; and
    creating choke points based on the clusters of probe trace data and the determined decision points,
    wherein the plurality of maneuvers are generated by examining clustered segments of the transportation network between adjacent ones of the created choke points.

9. The method of claim 8, wherein the clustered segments of the transportation network are stored as the features of the digital representation of the transportation network.

10. The method of claim 8, wherein the decision points are points at which clusters of the probe trace data converge or diverge.

11. The method of claim 8, wherein the examining of the plurality of clustered segments of the transportation network comprises: combining the clustered segments to determine a mean path between adjacent ones of the created choke points.

12. The method of claim 1, further comprising:
    clustering the probe trace data for location probes following a same path;
    determining decision points in the transportation network by comparing the clusters of probe trace data;
    creating choke points based on the clusters of probe trace data and the determined decision points; and
    fitting a mathematical curve to combined probe trace data between each pair of adjacent choke points,
    wherein the fitted and combined probe trace data are stored as the features of the digital representation of the transportation network.

13. A system for determining features of a digital representation of a transportation network, said features comprising geometry of the transportation network and attributes associated therewith, the system comprising:
- a receiver for receiving a plurality of probe trace data for an area of interest, said probe trace data comprising a series of sequential location measurements acquired by one or more location sensors; and
- a processor configured to:
  - determine a plurality of choke points in relation to said probe trace data, each of said choke points comprising a non-decision point falling between adjacent decision points in said probe trace data:
  - generate a plurality of maneuvers from said probe trace data, each of said maneuvers comprising a mean path of a plurality of probe trace data that traverses the same path between adjacent choke points;
  - determining the features of the digital representation of the transportation network based on said plurality of maneuvers; and
  - updating the digital representation of the transportation network by storing the determined features, wherein geometry of the transportation network in the updated digital representation is stored as a series of the plurality of maneuvers; and
  - providing the updated digital representation for use by one or more of a navigation device and an advanced driver assistance system (ADAS).

14. A non-transitory computer-readable storage medium storing instructions that, when executed by a processor of a computer system, cause the processor to perform a method comprising:

- acquiring, from one or more location sensors, a plurality of probe trace data for an area of interest, said probe trace data comprising a series of sequential location measurements acquired by said one or more location sensors;
- determining, by a processor, a plurality of choke points in relation to the probe trace data, each of said choke points comprising a non-decision point falling between adjacent decision points in said probe trace data;
- generating, by the processor, a plurality of maneuvers from said probe trace data, each of said maneuvers comprising a mean path of probe trace data from the plurality of probe trace data that traverses the same path between adjacent choke points; and
- determining, by the processor, features of the digital representation of the transportation network based on the plurality of maneuvers; wherein said features comprise geometry of the transportation network and attributes associated therewith; and
- updating, by the processor, the digital representation of the transportation network by storing the determined features, wherein geometry of the transportation network in the updated digital representation is stored as a series of the plurality of maneuvers; and
- providing, by the processor, the updated digital representation for use by one or more of a navigation device and an advanced driver assistance system (ADAS).

* * * * *